(12) United States Patent
Ikuta et al.

(10) Patent No.: US 11,592,365 B2
(45) Date of Patent: Feb. 28, 2023

(54) SMEAR PREPARING APPARATUS, METHOD OF CONTROLLING SMEAR PREPARING APPARATUS, AND SAMPLE PROCESSING APPARATUS

(71) Applicant: SYSMEX CORPORATION, Kobe (JP)

(72) Inventors: Junya Ikuta, Kobe (JP); Masaharu Shibata, Kobe (JP); Noriyuki Nakanishi, Kobe (JP); Mitsuo Yamasaki, Kobe (JP); Yuji Takano, Kobe (JP); Ken Nishikawa, Kobe (JP)

(73) Assignee: SYSMEX CORPORATION, Kobe (JP)

( * ) Notice: Subject to any disclaimer, the term of this patent is extended or adjusted under 35 U.S.C. 154(b) by 192 days.

(21) Appl. No.: 16/911,426

(22) Filed: Jun. 25, 2020

(65) Prior Publication Data

US 2020/0408650 A1 Dec. 31, 2020

(30) Foreign Application Priority Data

Jun. 26, 2019 (JP) .............................. JP2019-118770

(51) Int. Cl.
*G01N 1/00* (2006.01)
*G01N 1/28* (2006.01)
(Continued)

(52) U.S. Cl.
CPC ............ *G01N 1/2813* (2013.01); *G01N 1/312* (2013.01); *G01N 35/00029* (2013.01); *G01N 35/00722* (2013.01); *G01N 35/1009* (2013.01); *G01N 2035/00138* (2013.01); *G01N 2035/00168* (2013.01); *G01N 2035/00891* (2013.01)

(58) Field of Classification Search
None
See application file for complete search history.

(56) References Cited

U.S. PATENT DOCUMENTS 8,778,266 B2 *  7/2014  Yamasaki ............. G01N 1/312
                                                    422/65
2009/0098646 A1  4/2009  Takizawa et al.

FOREIGN PATENT DOCUMENTS

EP   3410093 A1   12/2018
EP   3441770 A1   2/2019
(Continued)

OTHER PUBLICATIONS

An extended European search report (EESR) dated Oct. 27, 2020 in a counterpart European patent application.
(Continued)

*Primary Examiner* — Jyoti Nagpaul
(74) *Attorney, Agent, or Firm* — Metrolex IP Law Group, PLLC

(57) ABSTRACT

A smear preparing apparatus that operates under selectable operation modes, may include: a smearing unit that prepares smeared slides by smearing samples onto slides; a staining unit that is capable of housing the smeared slides and that performs staining processing by accommodating a staining solution used to stain the samples on the housed smeared slides; a fluid circuit that supplies the staining solution to the staining unit; and a controller that controls the supplying of the staining solution to the staining unit depending on a selected one of the operation modes.

14 Claims, 18 Drawing Sheets

(51) Int. Cl.
   *G01N 1/31*    (2006.01)
   *G01N 35/00*   (2006.01)
   *G01N 35/10*   (2006.01)

(56) References Cited

FOREIGN PATENT DOCUMENTS

| | | |
|---|---|---|
| JP | 2007-114844 A | 5/2007 |
| JP | 2010-207939 A | 9/2010 |
| JP | 2019-35624 A | 3/2019 |
| WO | 2016/084377 A1 | 6/2016 |
| WO | 2017/038323 A1 | 3/2017 |
| WO | 2017/130790 A1 | 8/2017 |

OTHER PUBLICATIONS

An extended European search report (EESR) dated Oct. 27, 2020 in a counterpart European patent application of a related U.S. Appl. No. 16/911,449.
Office Action (JPOA) dated Nov. 29, 2022 in a counterpart Japanese patent application.

* cited by examiner

SMEAR PREPARING APPARATUS, METHOD OF CONTROLLING SMEAR PREPARING APPARATUS, AND SAMPLE PROCESSING APPARATUS

CROSS REFERENCE TO RELATED APPLICATIONS

This application claims priority to prior Japanese Patent Application No. 2019-118770 filed with the Japan Patent Office on Jun. 26, 2019, the entire contents of which are incorporated herein by reference.

BACKGROUND

The disclosure relates to a smear preparing apparatus that smears samples onto slides and stains the samples, a method of controlling the smear preparing apparatus, and a sample processing apparatus.

As illustrated in FIG. 25, International Patent Application Publication No. WO2017/038323 ("Patent Literature 1") discloses a smear preparing apparatus 900 including a smearing unit 901 that prepares smeared slides 912 by smearing samples onto slides 911, a staining unit 902 that is capable of housing smeared slides 912 and that performs staining processing by accommodating a staining solution used to stain the samples on the housed smeared slides 912, and a fluid circuit unit 903 that supplies the staining solution to the staining unit 902. The smear preparing apparatus 900 of Patent Literature 1 is configured to cause selection of an operation mode to perform the staining processing and an operation mode to not perform the staining processing.

For example, there is a demand for reducing the usage amount and the waste amount of the staining solution in the smear preparing apparatus as described above.

One or more aspects aim to reduce the usage amount and the waste amount of the staining solution.

SUMMARY

According to one or more embodiments, a smear preparing apparatus that operates under selectable operation modes, may include: a smearing unit that prepares smeared slides by smearing samples onto slides; a staining unit that is capable of housing the smeared slides and that performs staining processing by accommodating a staining solution used to stain the samples on the housed smeared slides; a fluid circuit that supplies the staining solution to the staining unit; and a controller that controls the supplying of the staining solution to the staining unit depending on a selected one of the operation modes.

According to one or more embodiments, a method of controlling a smear preparing apparatus that operates under selectable operation modes, may include: preparing smeared slides by smearing samples onto slides; selecting at least one of the operation modes; controlling supply of a staining solution to a staining unit depending on the selected operation mode, the staining unit being capable of housing the smeared slides and performing staining processing by accommodating the staining solution used to stain the samples on the housed smeared slides; supplying the staining solution to the staining unit according to the controlling the supply of the staining solution to the staining unit; and performing the staining processing by using the staining solution supplied to the staining unit.

According to one or more embodiments, a sample processing apparatus that operates under selectable operation modes, may include: a sample processor that performs processing on samples; and a controller. The controller may execute a first presentation step of presenting the operation modes to receive a selection among the operation modes. In response to a first operation mode being selected among the presented operation modes, the controller may execute a second presentation step of presenting operation modes relating to the first operation mode to receive a selection among the operation modes relating to the first operation mode. In response to a second operation mode being selected among the presented operation modes, the controller may execute a third presentation step of prohibiting a selection of at least one of the operation modes relating to the first operation mode.

DETAILED DESCRIPTION

Figure 1:
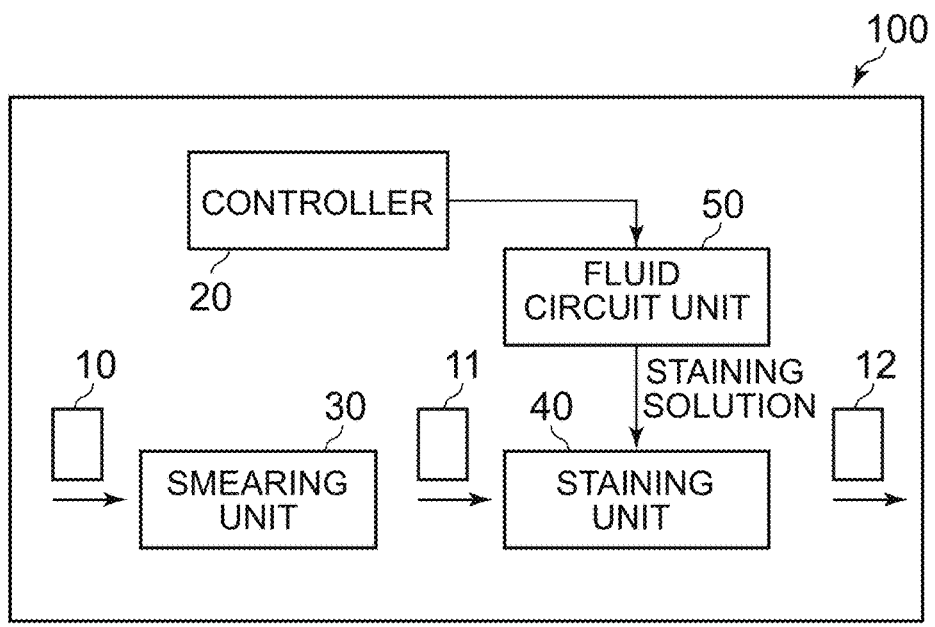
FIG. 1 is a schematic diagram illustrating an overview of a smear preparing apparatus according to an embodiment.

As illustrated in FIG. 1, a smear preparing apparatus (100) that operates in operation modes according to a first aspect comprises: a smearing unit (30) that prepares smeared slides (11) by smearing samples onto slides (10); a staining unit (40) that is capable of housing the smeared slides (11) and that performs staining processing by accommodating a staining solution used to stain the samples on the housed smeared slides (11); a fluid circuit unit (50) that supplies the staining solution to the staining unit (40); and a controller (20) that controls the supplying of the staining solution to the staining unit (40) depending on a selected one of the operation modes.

The smear preparing apparatus (100) that operates in the operation modes according to a first aspect comprises the controller (20) that controls the supplying of the staining solution to the staining unit (40) depending on the selected one of the operation modes as described above. Accordingly, when the staining processing is not performed, it is possible to reduce the usage amount and the waste amount of the staining solution which may be otherwise supplied to staining unit (40). Thus, the usage amount and the waste amount of the staining solution can be reduced.

Figure 2:
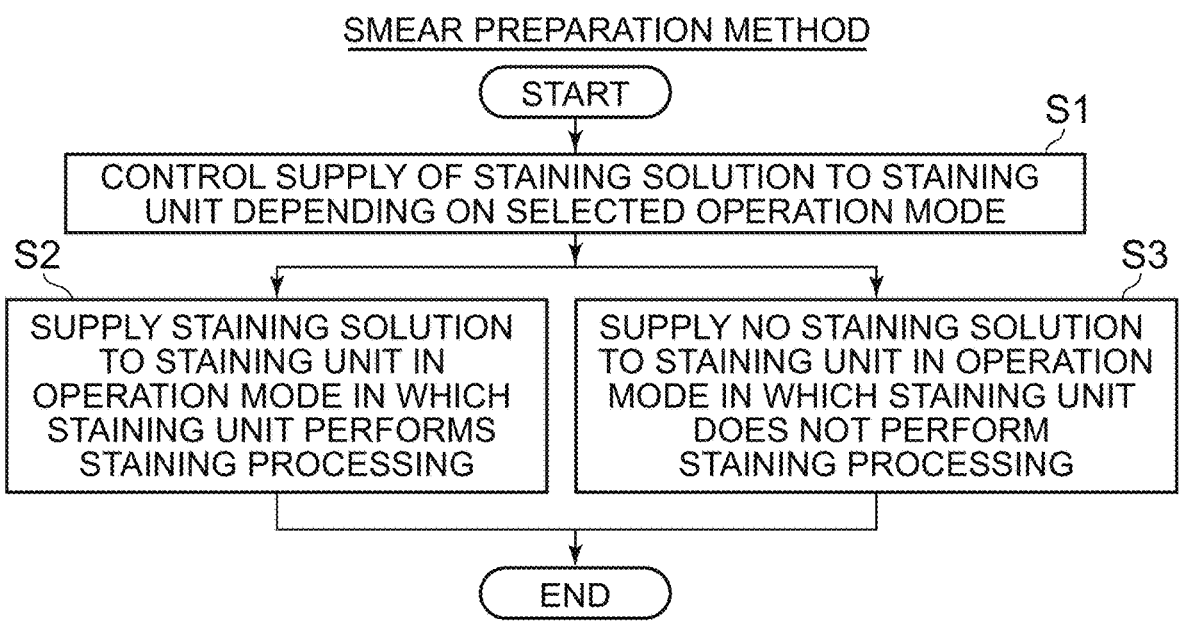
FIG. 2 is a diagram illustrating an overview of a smear preparation method according to an embodiment.

As illustrated in FIGS. 1 and 2, a method of controlling a smear preparing apparatus that operates in operation modes according to a second aspect comprises: preparing a smeared slide (11) by smearing a sample onto a slide (10); selecting at least one of the operation modes; controlling supply of a staining solution to a staining unit (40) depending on the selected operation mode, the staining unit (40) being capable of housing the smeared slides (11) and performing staining processing by accommodating the staining solution used to stain the samples on the housed smeared slides (11); supplying the staining solution to the staining unit (40) according to the controlling the supply of the staining solution to the staining unit (40); performing the staining processing by using the staining solution supplied to the staining unit (40).

The method of controlling the smear preparing apparatus according to a second aspect comprises selecting at least one of the operation modes and controlling the supply of the staining solution to the staining unit (40) depending on the selected operation mode, the staining unit (40) being capable of housing the smeared slides (11) and performing the staining processing by accommodating the staining solution used to stain the samples on the housed smeared slides (11) as described above. Accordingly, when the staining processing is not performed, it is possible to reduce the usage amount and the waste amount of the staining solution which may otherwise be supplied to staining unit (40). Thus, the usage amount and the waste amount of the staining solution can be reduced.

A sample processing apparatus that operates in operation modes according to a third aspect comprises: a sample processor that performs processing on samples; and a controller. The controller executes: a first presentation step of presenting the operation modes while causing selection thereof; when a first operation mode is selected from the presented operation modes, executes a second presentation step of presenting operation modes relating to the first operation mode while causing selection thereof; and when a second operation mode is selected from the presented operation modes, executes a third presentation step of presenting at least one of the operation modes relating to the first operation mode while prohibiting the selection thereof.

The sample processing apparatus that operates in the operation modes according to a third aspect includes control of: executing the first presentation step of presenting the operation modes while causing selection thereof; when the first operation mode is selected from the presented operation modes, executing the second presentation step of presenting the operation modes relating to the first operation mode while causing selection thereof; and when the second operation mode is selected from the presented operation modes, executing the third presentation step of presenting at least one of the operation modes relating to the first operation mode while prohibiting the selection thereof as described above. This causes the user to select an appropriate operation mode depending on a selected operation mode and can thus improve user operability.

One or more aspects can reduce the usage amount and the waste amount of the staining solution.

An embodiment is explained below based on drawings.

(Overview of Smear Preparing Apparatus)

An overview of a smear preparing apparatus 100 according to an embodiment that operates in operation modes is described with reference to FIG. 1.

The smear preparing apparatus 100 is an apparatus configured to perform smearing processing of preparing smeared slides 11 by smearing samples onto slides 10 and perform staining processing on the smeared slides 11 on which the sample is smeared to automatically prepare smears 12. The samples are, for example, blood.

As illustrated in FIG. 1, the smear preparing apparatus 100 includes a controller 20, a smearing unit 30, a staining unit 40, and a fluid circuit unit 50 or a fluid circuit.

The controller 20 controls units of the smear preparing apparatus 100. The controller 20 controls supply of a staining solution to the staining unit 40 performed by the fluid circuit unit 50.

The smearing unit 30 performs the smearing processing of preparing the smeared slide 11 by smearing the sample on the slide 10.

The staining unit 40 performs the staining processing on the sample on the smeared slide 11 subjected to the smearing processing. The staining unit 40 is capable of housing smeared slides 11 and performs the staining processing by accommodating the staining solution which stains the samples on the housed smeared slides 11.

In this case, the controller 20 controls the supply of the staining solution to the staining unit 40 depending on an operation mode selected from the operation modes. Specifically, when a user performs a predetermined manipulation or operation to select an operation mode in which the staining unit 40 performs no staining processing, the controller 20 controls the fluid circuit unit 50 such that the fluid circuit unit 50 does not supply the staining solution to the staining unit 40. Meanwhile, when the user performs a predetermined manipulation or operation to select an operation mode in which the staining unit 40 performs the staining processing, the controller 20 controls the fluid circuit unit 50 such that the fluid circuit unit 50 supplies the staining solution to the staining unit 40.

As in the aforementioned configuration, there is provided the controller 20 capable of selectively executing the operation mode to supply the staining solution to the staining unit 40 or the operation mode to not supply the staining solution to the staining unit 40, depending on an operation mode selected through a predetermined manipulation or operation of a user. Accordingly, in the operation mode to not perform the staining processing, it is possible to reduce the usage amount and the waste amount of the staining solution which may be otherwise supplied to staining unit 40. Thus, the usage amount and the waste amount of the staining solution can be reduced.

(Smear Preparation Method)

Next, a smear preparation method in an embodiment is described. The smear preparation method in an embodiment is a method of preparing the smears 12 by using the smear preparing apparatus 100 including the smearing unit 30 that prepares the smeared slide 11 by smearing the samples onto the slide 10, the staining unit 40 that is capable of housing smeared slides 11 and that performs the staining processing by accommodating the staining solution used to stain the samples on the housed smeared slides 11, and the fluid circuit unit 50 that supplies the staining solution to the staining unit 40.

A method of controlling the smear preparing apparatus in an embodiment includes preparing the smeared slide 11 by smearing the sample onto the slide 10, selecting at least one of the operation modes, controlling the supply of the staining solution to the staining unit 40 depending on the operation mode selected by the user manipulation or operation, the staining unit being capable of housing smeared slides 11 and performing the staining processing by accommodating the staining solution used to stain the samples on the housed smeared slides 11, supplying the staining solution to the staining unit depending on the controlling the supply of the staining solution to the staining unit 40, and performing the staining processing by using the staining solution supplied to the staining unit.

As illustrated in FIG. 2, the smear preparation method of an embodiment includes at least the following steps S1 to S3. (S1) The supply of the staining solution to the staining unit 40 is controlled depending on the selected operation mode. (S2) In the operation mode in which the staining unit 40 performs the staining processing, the staining solution is supplied to the staining unit 40. (S3) In the operation mode in which the staining unit 40 does not perform the staining processing, no staining solution is supplied to the staining unit 40.

As described above, in the method of controlling the smear preparing apparatus in an embodiment, the operation mode to not supply the staining solution to the staining unit 40 or the operation mode to supply the staining solution to the staining unit 40 can be selectively executed depending on the selected operation mode. Accordingly, in the operation mode to not perform the staining processing, it is possible to reduce the usage amount and the waste amount of the staining solution which may otherwise be supplied to staining unit 40. Thus, the usage amount and the waste amount of the staining solution can be reduced.

(Detailed Configuration of Smear Preparing Apparatus)

A configuration of the smear preparing apparatus 100 illustrated in FIG. 1 in a preferable embodiment is specifically described below with reference to FIG. 3 and beyond. The smear preparing apparatus 100 is an apparatus that performs the smearing processing of smearing the samples on the slides 10 and that performs the sample staining processing on the smeared slides 11 on which the samples are smeared. The samples are, for example, blood.

Figure 3:
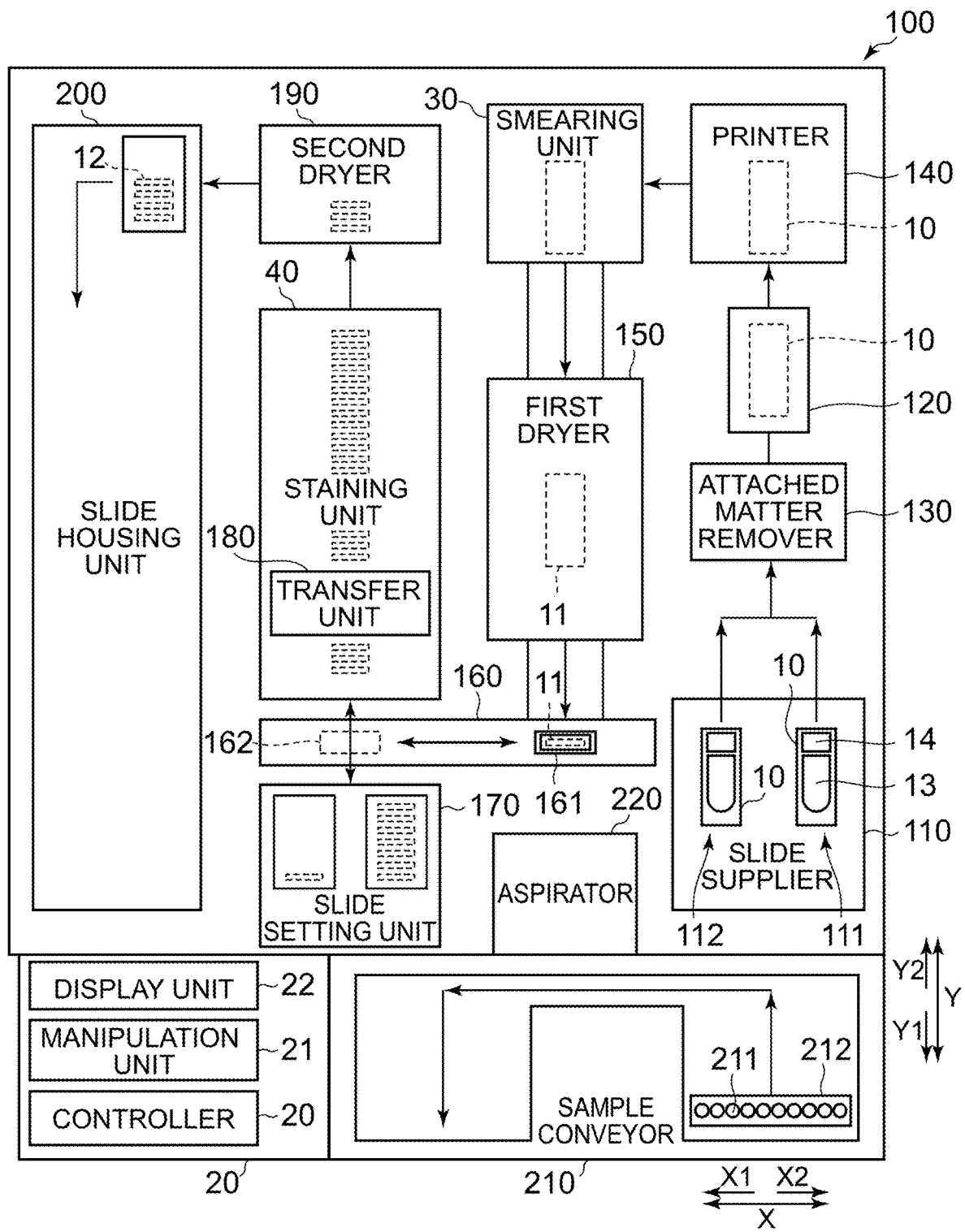
FIG. 3 is a plan diagram illustrating an outline of a smear preparing apparatus according to an embodiment.

As illustrated in FIG. 3, the smear preparing apparatus 100 includes a slide supplier 110, a transfer mechanism 120, an attached matter remover 130, a printer 140, the smearing unit 30, a first dryer 150, and a slide conveyor 160. Moreover, the smear preparing apparatus 100 includes the staining unit 40, the fluid circuit unit 50 (see FIG. 7), a slide setting unit 170, a transfer unit 180, a second dryer 190, and a slide housing unit 200. Furthermore, the smear preparing apparatus 100 includes the controller 20, a manipulation unit 21, a display unit 22, a memory 23 (see FIG. 4), and a communication unit 24 (see FIG. 4). Moreover, the smear preparing apparatus 100 includes a sample conveyor 210 and an aspirator 220.

In the following description, two directions orthogonal to each other in a plane parallel to an installation surface of the smear preparing apparatus 100 (that is, a horizontal plane) are referred to as X direction and Y direction. In an example of FIG. 3, the smear preparing apparatus 100 has a quadrilateral outer shape extending in the X direction and the Y direction in a plan view. The X direction is referred to as a left-right direction of the smear preparing apparatus 100 and the Y direction is referred to as a front-back direction of the smear preparing apparatus 100. A Y1 direction side is the front side of the apparatus and a Y2 direction side is the back side of the apparatus. Moreover, an up-down direction orthogonal to the horizontal plane is referred to as Z direction.

Multiple sample containers 211 housing the samples are set in the sample conveyor 210 and the sample conveyor 210 conveys the set sample containers 211 to a predetermined take-in position. The sample conveyor 210 conveys, for example, a rack 212 holding the sample containers 211. The aspirator 220 aspirates liquid samples such as blood or urine from the sample containers 211 conveyed to the take-in position by the sample conveyor 210. The aspirator 220 supplies the aspirated samples to the smearing unit 30.

In a configuration example of FIG. 3, the slide supplier 110 includes a first supplier 111 and a second supplier 112. The slide supplier 110 may include one or three or more suppliers. The slide supplier 110 can house many unused slides 10 unsmeared with the samples in the first supplier 111 and the second supplier 112. The slides 10 are horizontally housed inside the first supplier 111 and the second supplier 112 such that smearing surfaces thereof face upward.

The first supplier 111 and the second supplier 112 have substantially the same configuration. The first supplier 111 and the second supplier 112 are arranged side by side in the X direction. Each of the first supplier 111 and the second supplier 112 can supply the slides 10 one by one by moving the unsmeared slides 10 housed therein in the Y2 direction.

The transfer mechanism 120 can convey one slide 10 by, for example, holding it on an upper surface. The transfer mechanism 120 can receive the slide 10 from the first supplier 111. Moreover, the transfer mechanism 120 can receive the slide 10 from the second supplier 112. The transfer mechanism 120 is movable in a horizontal direction (XY direction). Moreover, the transfer mechanism 120 can move the holding slide 10 in the up-down direction (Z direction). The transfer mechanism 120 can convey the holding slide 10 to processing positions of the attached matter remover 130, the printer 140, and the smearing unit 30. The transfer mechanism 120 conveys the slide 10 received from the slide supplier 110, to the attached matter remover 130, to the printer 140, and to the smearing unit 30 in this order. The transfer mechanism 120 may be capable of holding slides 10. The transfer mechanism 120 may be movable in the XY direction but unmovable in the Z direction.

The attached matter remover 130 has a function of removing matters attached to a surface of the slide 10. The attached matter remover 130 performs processing of removing the attached matters on the slide 10 held on the upper surface of the transfer mechanism 120. For example, the attached matter remover 130 can discharge air to blow away the attached matters in a smear region 13 and a print region 14 of the slide 10. The attached matters are, for example, small foreign objects such as glass powder and dust.

In the configuration example of FIG. 3, the printer 140 can print various pieces of information such as sample information in the print region 14 of the slide 10. Moreover, the printer 140 performs printing on the slide 10 held on the upper surface of the transfer mechanism 120.

In the configuration example of FIG. 3, the smearing unit 30 prepares the smeared slide 11 by smearing the sample onto the slide 10. The smearing unit 30 can smear the sample onto the smear region 13 of the slide 10. Moreover, the smearing unit 30 smears the sample onto the slide 10 held on the upper surface of the transfer mechanism 120. The smearing unit 30 places a drop of the sample supplied from the aspirator 220 onto the smear region 13 of the slide 10 and performs smearing processing on the slide 10 by a smearing method using a smearing member, such as a spreader slide (so-called wedge technique). The smearing unit 30 includes a driving mechanism including a nozzle for dropping the sample and a motor for moving the smearing member.

The first dryer 150 has a function of receiving the smeared slide 11 on which the sample is smeared from the smearing unit 30 and blowing air to the smear region 13 of the smeared slide 11. The first dryer 150 can dry the sample smeared onto the smeared slide 11 by blowing air.

The slide conveyor 160 is arranged on the Y1 direction side of the first dryer 150 and the staining unit 40 and is provided to extend in the X direction. The slide conveyor 160 is configured to convey the smeared slide 11 in the X1 direction from the first dryer 150 to a take-out position 162 between the staining unit 40 and the slide setting unit 170. The slide conveyor 160 includes a housing portion 161 that houses the smeared slide 11, and can move the housing portion 161 in the X direction. The slide conveyor 160 receives the smeared slide 11 laid substantially parallel to the installation surface in the housing portion 161 and conveys the smeared slide 11 to the take-out position 162 while causing the smeared slide 11 to stand substantially perpendicular to the installation surface. Accordingly, at the take-out position 162, the smeared slide 11 is held with the smear surface thereof standing to extend in the up-down direction (Z direction). The smeared slide 11 conveyed to the take-out position 162 is conveyed to the staining unit 40 or the slide setting unit 170.

The staining unit 40 is configured to stain the sample smeared on the smeared slide 11. The staining unit 40 is arranged side by side with the first dryer 150 on the X1 direction side thereof and is configured to receive the smeared slide 11 conveyed from the first dryer 150.

The staining unit 40 includes staining tanks 41, 42, 43, 45, and 46 (see FIG. 5) used to accommodate the staining solution and cleaning tanks 44 and 47 (see FIG. 5) used to accommodate the cleaning liquid. The staining unit 40 executes the staining processing and cleaning processing on the smeared slides 11 subjected to smearing, in the staining tanks 41, 42, 43, 45, and 46 and the cleaning tanks 44 and 47. The staining tanks 41, 42, 43, 45, and 46 can each house smeared slides 11.

The slide setting unit 170 is arranged on the Y1 direction side of the staining unit 40 and configured to hold the smeared slides 11 in such a way that the smeared slides 11 can be transferred in and out. Specifically, the slide setting unit 170 can hold smeared slides 11 on which the samples are smeared and which are not subjected to the staining processing. Moreover, the slide setting unit 170 can hold the slides 10 on which the printer 140 has printed the information and which is not subjected to the smearing processing.

The transfer unit 180 can convey each smeared slide 11 between any two of the staining unit 40, the slide setting unit 170, and the take-out position 162. For example, the transfer unit 180 can move in the X direction, the Y direction, and the Z direction at a height position above the staining unit 40, the slide setting unit 170, and the take-out position 162. The transfer unit 180 can thus grab and take out the smeared slide 11 arranged at any of the staining unit 40, the slide setting unit 170, and the take-out position 162 and convey the smeared slide 11 to any of the staining unit 40, the slide setting unit 170, and the take-out position 162. Moreover, the transfer unit 180 holds and transfers one smeared slide 11. Specifically, the transfer unit 180 transfers the smeared slides 11 out from and into the staining unit 40 one by one. Moreover, the controller 20 controls the transfer unit 180 such that the transfer unit 180 transfers the smeared slides 11 to the staining unit 40 one by one and takes the smeared slides 11 for which stain time of performing the staining processing has elapsed, out from the staining unit 40 one by one in order. The staining processing can be thereby performed with the staining solution accommodated in the staining unit 40 and the amount of the staining solution supplied to the staining unit 40 can be thus reduced from that in the case of batch processing in which the staining solution is replaced every time the staining processing is performed. This can also reduce the consumption amount of the staining solution.

Moreover, in the smear preparing apparatus 100, the user can manually convey the smeared slides 11 on which the samples are smeared and which are set in the slide setting unit 170, from the slide setting unit 170 to the staining unit 40. The smear preparing apparatus 100 can thus operate in, in addition to a normal mode in which the printing processing, the smearing processing, and the staining processing are performed, a smearing mode in which the smeared slides 11 subjected to the printing processing and the smearing processing in the printer 140 and the smearing unit 30 is sent out to the slide setting unit 170 without being subjected to the staining processing and a staining mode in which the staining unit 40 performs the staining processing on the smeared slides 11 on which the samples are smeared and which are set in the slide setting unit 170 manually by the user and the smeared slide is sent out to the slide housing unit 200.

In a configuration example of FIG. 3, the second dryer 190 is arranged side by side with the staining unit 40 on the Y2 direction side thereof. The second dryer 190 receives the smears 12 which are the smeared slides 11 subjected to the staining processing in the staining unit 40. The second dryer 190 has a function of, for example, blowing air to dry the smears 12 stained by the staining unit 40. The second dryer 190 hands over the dried smears 12 to the slide housing unit 200.

The slide housing unit 200 has a function of receiving and housing the smears 12 processing for which is completed. In a configuration example of FIG. 3, the slide housing unit 200 is arranged side by side with the second dryer 190 on the X1 direction side thereof and receives the slides 10 conveyed from the second dryer 190.

The controller 20 controls operations of the units in the smear preparing apparatus 100. The controller 20 is a computer including a processor such as a CPU and a volatile memory and/or a non-volatile memory. The computer functions as the controller of the smear preparing apparatus 100 by causing the processor to execute a program stored in the memory. The processor may be a FPGA (field-programmable gate array) or the like that is designed to function as the controller 20.

The manipulation unit 21 receives an input of a manipulation on the smear preparing apparatus 100. The manipulation unit 21 is, for example, a keyboard, a mouse, a touch panel provided in the display unit 22, or the like.

The display unit 22 displays a status of the smear preparing apparatus 100 and information for manipulation. The display unit 22 is, for example, a liquid crystal display, an organic EL display, or the like.

In the aforementioned configuration, the smear preparing apparatus 100 can automatically prepare the smears 12 by performing processing of the printing processing, the sample smearing processing, and the staining processing on the slides 10.

(Control Blocks)

Figure 4:
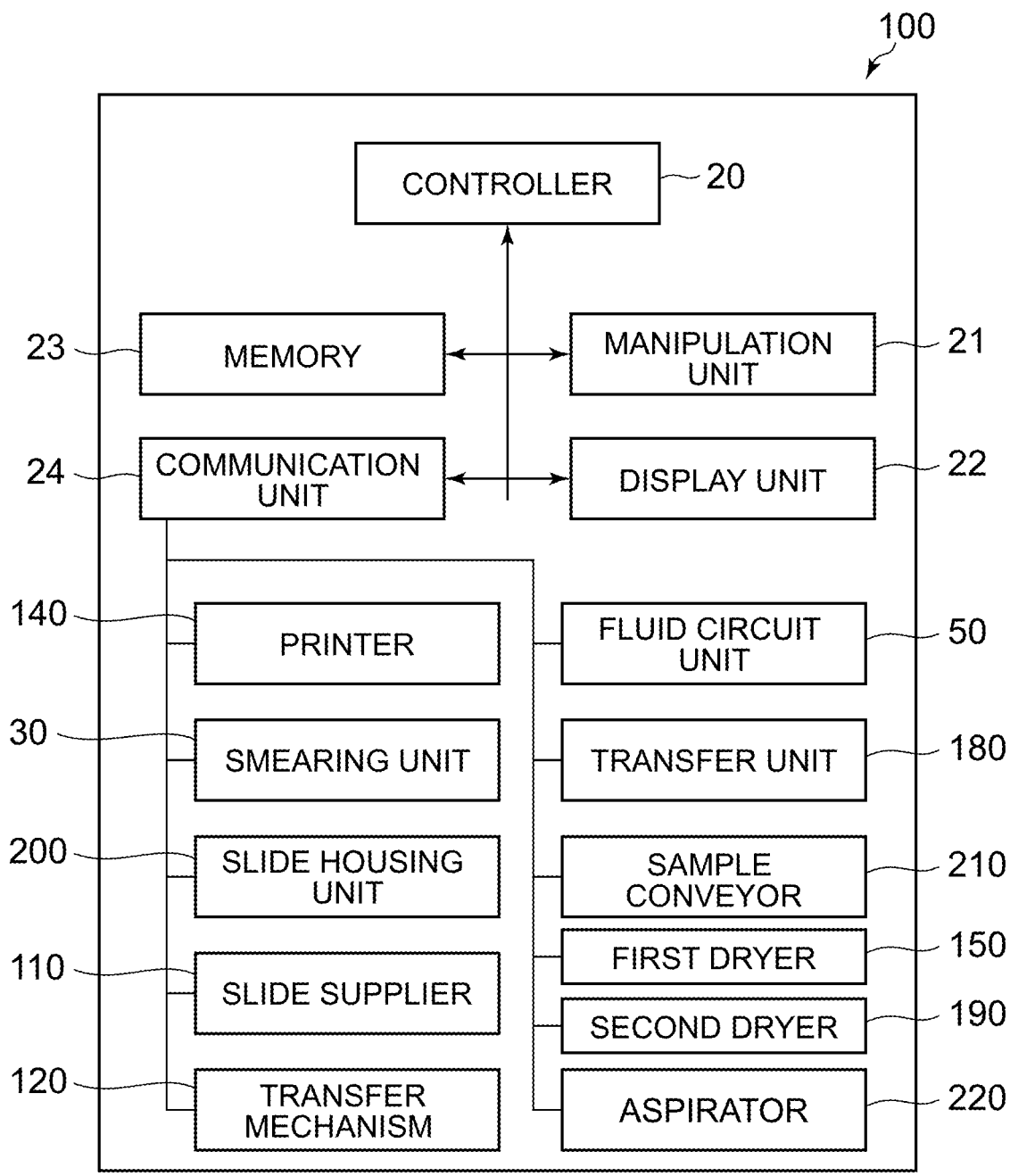
FIG. 4 is a block diagram illustrating a control configuration of a smear preparing apparatus according to an embodiment.

As illustrated in FIG. 4, the controller 20 is electrically connected to the manipulation unit 21, the display unit 22, the memory 23, and the communication unit 24. The controller 20 controls the mechanisms included in the smear preparing apparatus 100 via the communication unit 24, based on a program and setting information stored in the memory 23.

The communication unit 24 includes an I/O interface that exchanges signals between the controller 20 and the mechanisms included in the smear preparing apparatus 100. The controller 20 is connected to the mechanisms such as the printer 140, the smearing unit 30, the slide housing unit 200, the slide supplier 110, the transfer mechanism 120, the fluid circuit unit 50, the transfer unit 180, the sample conveyor 210, the first dryer 150, the second dryer 190, and the aspirator 220, via the communication unit 24. Moreover, the controller 20 controls supply operations and discharge operations of the staining solution and the cleaning liquid that are performed by the fluid circuit unit 50, via the communication unit 24. The controller 20 controls a transfer operation of the smeared slides 11 by the transfer unit 180, via the communication unit 24.

In this example, the controller 20 is configured to be capable of selectively executing the operation mode to not supply the staining solution to the staining unit 40 or the operation mode to supply the staining solution to the staining unit 40, depending on the selected operation mode.

Specifically, the controller 20 controls the supply of the staining solution to the staining unit 40 in the operation mode in which the transfer unit 180 transfers the smeared slides 11 to the staining unit 40 and the operation mode in which the transfer unit 180 does not transfer the smeared slides 11 to the staining unit 40. Note that the operation mode in which the transfer unit 180 transfers the smeared slides 11 to the staining unit 40 is the operation mode to perform the staining processing on the smeared slides 11 and the operation mode in which the transfer unit 180 does not transfer the smeared slides 11 to the staining unit 40 is the operation mode to not perform the staining processing on the smeared slides 11. Moreover, the operation modes include an operation mode to prepare the smeared slides 11 by smearing the samples onto the slides 10 and the staining processing is not performed on the prepared smeared slide 11 and an operation mode to prepare the smeared slides 11 by smearing the samples onto the slides 10 and the staining processing is performed on the prepared smeared slides 11.

Moreover, when the operation mode to not perform the staining processing is selected, the controller 20 performs control such that the staining unit 40 is not filled or replenished with the staining solution. No staining solution is thereby supplied to the staining unit 40 in the operation mode to not perform the staining processing, and the usage amount and the waste amount of the staining solution can be thus reduced. When the operation mode to not perform the staining processing is selected, the controller 20 may control the fluid circuit unit 50 such that the filling or replenishing of the staining unit 40 with the staining solution is more limited than that in the case where the operation mode to perform the staining processing is selected. In the filling at least partially the staining unit 40 with the staining solution, the fluid circuit unit 50 supplies a quantity of the staining solution sufficient to stain the smeared slides 11 to the staining unit 40. In the replenishment of the staining unit 40 with the staining solution, the fluid circuit unit 50 replenishes the staining unit 40 with the staining solution every predetermined period or every time a predetermined number of the smeared slides 11 are stained.

When the selected operation mode is changed from the operation mode to not perform the staining processing to the operation mode to perform the staining processing, the controller 20 controls the fluid circuit unit 50 such that the fluid circuit unit 50 supplies the staining solution to the staining unit 40. The usage amount and the waste amount of the staining solution supplied to the staining unit 40 can be thereby suppressed until the selected operation mode is changed to the operation mode to perform the staining processing, and the usage amount and the waste amount of the staining solution can be thus effectively reduced. Moreover, when the selected operation mode is changed from the operation mode to perform the staining processing to the operation mode to not perform the staining processing, the controller 20 controls the fluid circuit unit 50 such that the fluid circuit unit 50 discharges the staining solution from the staining unit 40.

When no staining solution is supplied to the staining unit 40, the controller 20 controls the fluid circuit unit 50 such that the fluid circuit unit 50 supplies the cleaning liquid to the staining unit 40 with the amount thereof reduced from that in the case where the staining solution is supplied to the staining unit 40. The consumption amount of the cleaning liquid used to clean the staining unit 40 can be thereby reduced. For example, when no staining solution is supplied to the staining unit 40, the controller 20 controls the fluid circuit unit 50 such that the fluid circuit unit 50 supplies no cleaning liquid to the staining unit 40. The usage amount and the waste amount of the cleaning liquid used to clean the staining unit 40 can be thereby effectively reduced.

The controller 20 performs control of displaying a manipulation screen for selecting the operation mode, on the display unit 22. The user can thereby easily select the operation mode based on the manipulation screen displayed on the display unit 22. For example, in activation, the controller 20 performs control of displaying the manipulation screen for setting the operation mode, on the display unit 22. The user can thereby select whether to accommodate the staining solution in the staining unit 40 or not in the activation. In this case, the activation is an operation in which AC power supplied from a general-purpose power supply is converted to DC power to be supplied to an I/O interface of the controller 20, an activation signal is transmitted to the I/O interface of the controller 20, and, as a result, the controller 20 displays the manipulation screen on the display unit 22. Note that the activation may be a mode in which the power is supplied to the I/O interface of the controller 20, the activation signal is transmitted to the I/O interface of the controller 20, and, as a result, the controller 20 notifies the user of, for example, switches, buttons, or the like that can be used to select the operation modes, instead of displaying the manipulation screen on the display unit 22.

Moreover, the controller 20 performs control of displaying a manipulation screen on which the user can select whether to perform the staining processing by the staining unit 40 or not, on the display unit 22. The user can thereby select whether to perform the staining processing on the smeared slides 11 or not. Moreover, when the user performs a selection manipulation of not performing the staining processing by the staining unit 40, the controller 20 performs control of displaying a manipulation screen on which the user cannot select the operation modes to perform the staining processing, on the display unit 22. The user can thereby easily select the operation mode that can be performed with no staining solution accommodated in the staining unit 40.

Figure 15:
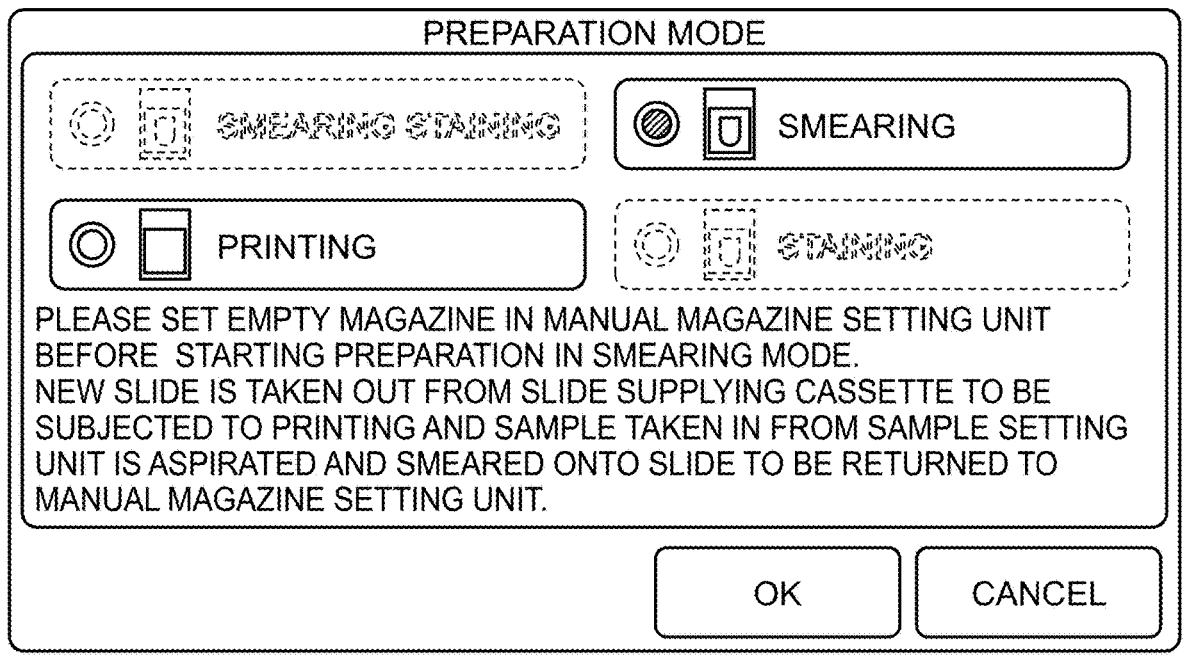
FIG. 15 is a diagram illustrating a second example of a selection screen in mode selection in a smear preparing apparatus according to an embodiment.
Figure 17:
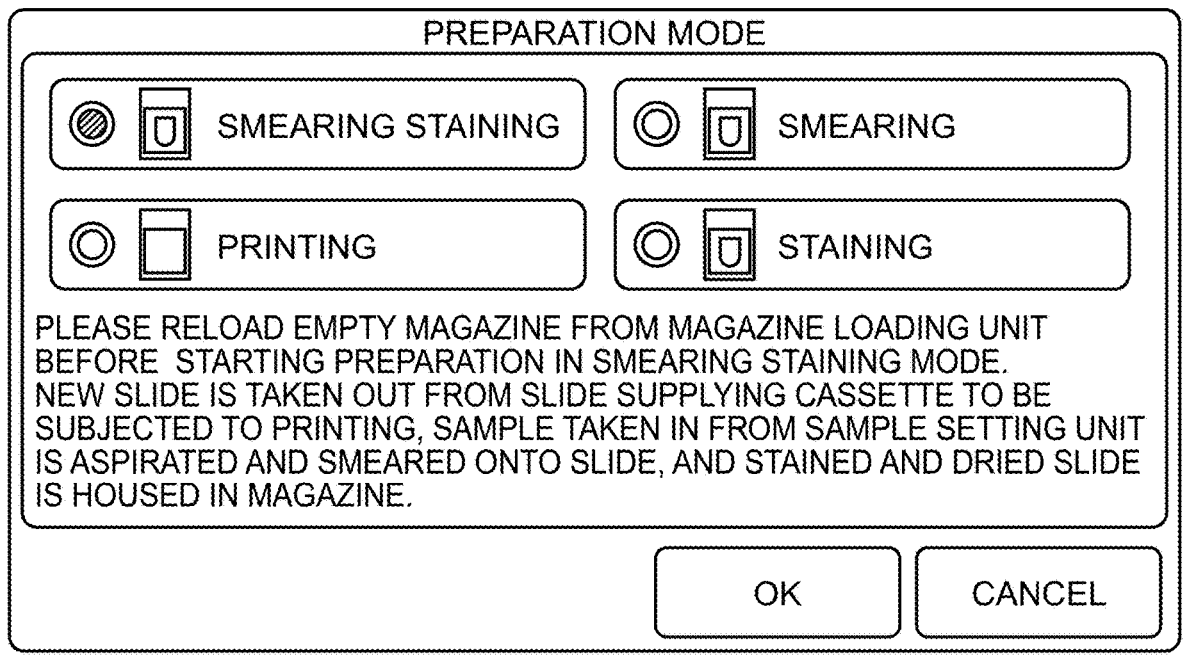
FIG. 17 is a diagram illustrating a fourth example of a selection screen in mode selection in a smear preparing apparatus according to an embodiment.

For example, when the user performs the selection manipulation of performing the staining processing, as illustrated in FIG. 17, the controller 20 performs control of displaying a manipulation screen on which the user can select a smearing staining mode, the smearing mode, a printing mode, or the staining mode, on the display unit 22. Meanwhile, when the user performs the selection manipulation of not performing the staining processing, as illustrated in FIG. 15, the controller 20 performs control of displaying a manipulation screen on which the user cannot select the smearing staining mode or the staining mode and can select the printing mode or the smearing mode, on the display unit 22.

Furthermore, the controller 20 may display a manipulation screen on which the user can directly select any of the operation modes, without displaying the manipulation screen on which the user can select whether to perform the staining processing by the staining unit 40 or not. In this case, the controller 20 may cause the staining solution to be supplied to the staining unit 40 when the user selects the smearing staining mode or the staining mode in which the staining processing by the staining unit 40 is performed, and cause no staining solution to be supplied to the staining unit 40 when the user selects the printing mode or the smearing mode in which the staining processing by the staining unit 40 is not performed.

Moreover, the controller 20 may display a manipulation screen on which the user can select the smearing staining mode, the smearing mode, the printing mode, or the staining mode, on the display unit 22 and then display a manipulation screen on which the user can select whether to perform the staining processing by the staining unit 40. In this case, the controller 20 may causes the staining solution to be supplied to the staining unit 40 when the user selects the smearing staining mode or the staining mode and performs the selection manipulation of performing the staining processing, and causes no staining solution to be supplied to the staining unit 40 when the user selects the printing mode or the smearing mode and performs the selection manipulation of not performing the staining processing.

Furthermore, when the user performs the selection manipulation of performing the staining processing, the controller 20 may display a manipulation screen on which the user can select the smearing staining mode or the smearing mode, on the display unit 22. Moreover, when the user performs the selection manipulation of not performing the staining processing, the controller 20 may display a manipulation screen on which the user cannot select the smearing staining mode, the staining mode, or the printing mode and can select the smearing mode, on the display unit 22.

(Detailed Configurations of Staining Unit and Transfer Unit)

Figure 5:
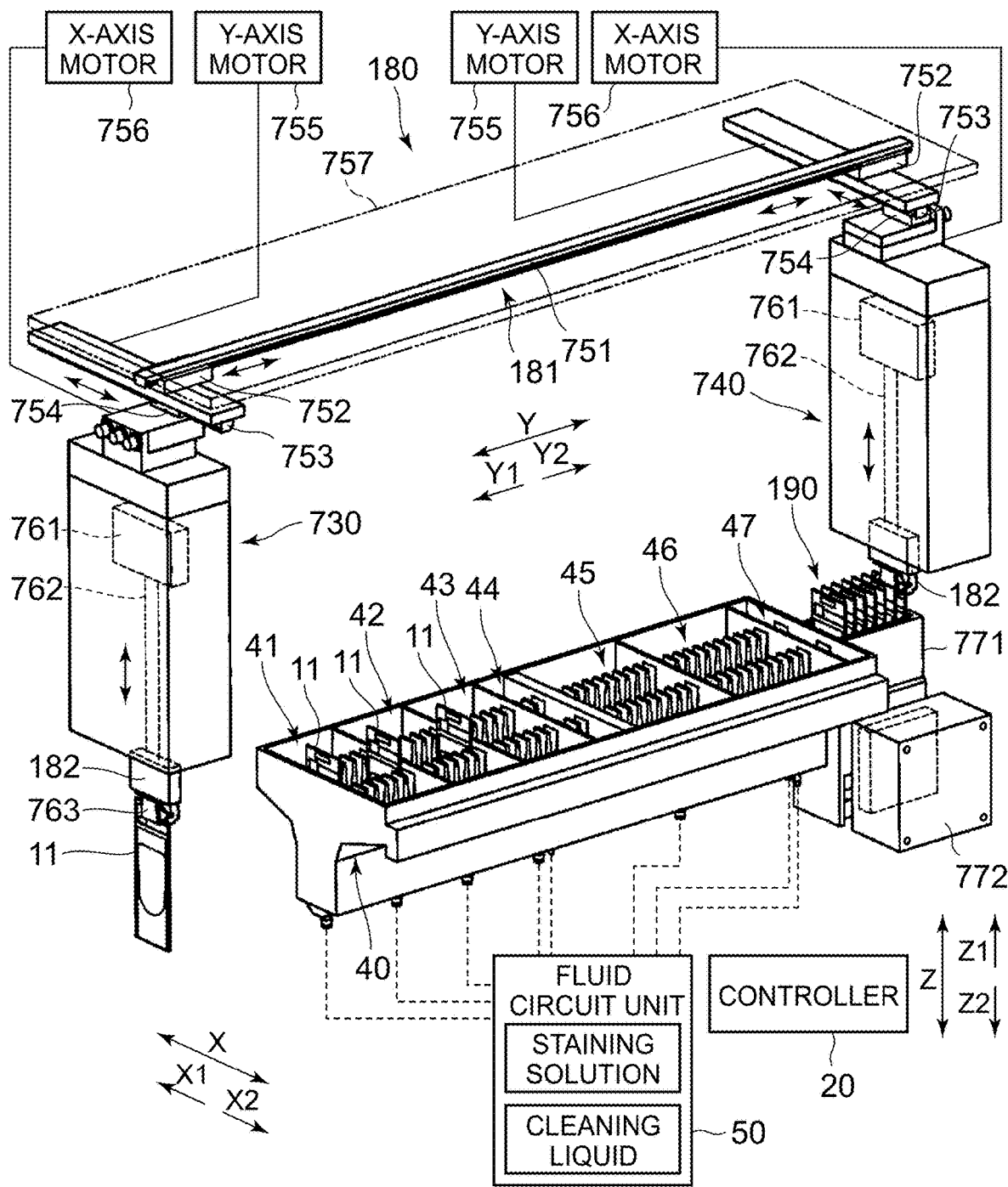
FIG. 5 is a perspective diagram illustrating a staining unit in a smear preparing apparatus according to an embodiment.

Configurations of the staining unit 40 and the transfer unit 180 are described with reference to FIG. 5. Note that the up-down direction is referred to as Z direction in the following description.

The staining unit 40 includes the staining tanks 41, 42, 43, 45, and 46 and the cleaning tanks 44 and 47. The smear preparing apparatus 100 includes the fluid circuit unit 50 that supplies the staining solution and the cleaning liquid to the staining tanks 41, 42, 43, 45, and 46 and the cleaning tanks 44 and 47 and discharges the staining solution and the cleaning liquid from these tanks.

Each of the staining tanks 41, 42, 43, 45, and 46 and the cleaning tanks 44 and 47 has a container shape open on the upper side and can be used to accommodate the staining solution or the cleaning liquid therein. The smeared slides 11 oriented such that the width direction extends in the X direction and the thickness direction extends in the Y direction can be inserted into each of the staining tanks 41, 42, 43, 45, and 46 and the cleaning tanks 44 and 47.

In the staining unit 40, the staining tank 41, the staining tank 42, the staining tank 43, the cleaning tank 44, the staining tank 45, the staining tank 46, and the cleaning tank 47 are arranged in the Y2 direction in this order.

Multiple plate-shaped holders are arranged in the staining tanks 41, 42, 43, 45, and 46 at equal intervals in the Y direction. One smeared slide 11 is inserted in a space between each two adjacent holders. The holders support both end portions of the inserted smeared slide 11 in the width direction and maintains the smeared slide 11 in a standing state. The cleaning tanks 44 and 47 can also hold the smeared slide 11 in the standing state.

Each smeared slide 11 is conveyed to the tanks one by one starting from the staining tank 41 and is processed by being immersed in the staining solution or the cleaning liquid accommodated in each tank for a predetermined set time.

The transfer unit 180 is arranged above (on the Z1 direction side of) the staining unit 40 and the slide setting unit 170 (see FIG. 3). The transfer unit 180 favorably includes a first transfer unit 730 and a second transfer unit 740. Providing the second transfer unit 740 in addition to the first transfer unit 730 causes the conveyance of the smeared slide 11 from the take-out position 162 (see FIG. 3) to the staining unit 40 and the conveyance of the smear 12 from the staining unit 40 to the slide housing unit 200 (see FIG. 3) to be independently performed and improves the conveyance efficiency. Each of the first transfer unit 730 and the second transfer unit 740 can be moved in horizontal directions (specifically, X direction and Y direction) by a movement mechanism 181.

The movement mechanism 181 includes a Y-axis rail 751 and Y-axis sliders 752 that extend in the Y direction, X-axis rails 753 and X-axis sliders 754 that extend in the X direction, Y-axis motors 755, and X-axis motors 756. For example, stepper motors or servo motors can be employed as the Y-axis motors 755 and the X-axis motors 756.

The Y-axis rail 751 is fixed to a lower surface of a supporting member 757. The supporting member 757 is a ceiling portion of a housing of the smear preparing apparatus 100, a support beam member, or the like. The Y-axis sliders 752 are attached on the lower surface side (Z2 direction side) of the Y-axis rail 751 and are movable along the Y-axis rail 751. The Y-axis motors 755 move the Y-axis sliders 752 in the Y direction via transmission mechanisms. For example, belt-and-pulley mechanisms, rack-and-pinion mechanisms, or the like can be employed as the transmission mechanism.

The X-axis rails 753 are fixed to lower surfaces of the Y-axis sliders 752. The X-axis sliders 754 are attached on the lower surface side (Z2 direction side) of the X-axis rails 753 and are movable along the X-axis rails 753. The X-axis motors 756 move the X-axis sliders 754 in the X direction via transmission mechanisms.

The Y-axis sliders 752, the X-axis rails 753, the X-axis sliders 754, the X-axis motors 756, and the Y-axis motors 755 are provided in pairs. The first transfer unit 730 is attached on the lower surface side of one of the X-axis sliders 754 and the second transfer unit 740 is attached on the lower surface side of the other X-axis slider 754. The first transfer unit 730 and the second transfer unit 740 can thereby independently move in the X direction along the respective X-axis rails 753. Moreover, the first transfer unit 730 and the second transfer unit 740 can independently move in the Y direction along the same Y-axis rail 751.

The configurations of the first transfer unit 730 and the second transfer unit 740 are the same. Each of the first transfer unit 730 and the second transfer unit 740 includes a hand 182, a Z-axis motor 761 that lifts and lowers the hand 182, and a transmission mechanism 762. The Z-axis motor 761 lifts and lowers the hand 182 via the transmission mechanism 762. For example, a belt-and-pulley mechanism, a rack-and-pinion mechanism, or the like can be employed as the transmission mechanism 762.

The hand 182 can grab one smeared slide 11. FIG. 5 illustrates an example of a configuration in which the hand 182 grabs the smeared slide 11 by holding it between paired grabbing plates 763 from both sides in the thickness direction of the smeared slide 11. The paired grabbing plates 763 come into contact with the front surface and the back surface of the smeared slide 11, respectively, and hold the smeared slide 11 therebetween. The paired grabbing plates 763 are movable relative to the smeared slide 11 in the thickness direction of the smeared slide 11 (Y direction). The movement of the grabbing plates 763 can be achieved by using, for example, an actuator such as an air cylinder, a motor, or a solenoid. Note that the hand 182 may be configured to hold the smeared slide 11 from both sides in the width direction of the smeared slide 11.

The first transfer unit 730 can move to positions above the staining tank 41, the staining tank 42, the staining tank 43, and the cleaning tank 44. Accordingly, the first transfer unit 730 can insert and pull out the smeared slides 11 one by one into and from the staining tank 41, the staining tank 42, the staining tank 43, and the cleaning tank 44

Moreover, the first transfer unit 730 can move to positions above the take-out position 162 and the slide setting unit 170. Accordingly, the first transfer unit 730 can take out the smeared slides 11 one by one from the take-out position 162 (see FIG. 3) and insert and pull out the smeared slides 11 one by one into and from the slide setting unit 170 (see FIG. 3).

The second transfer unit 740 can move to positions above the cleaning tank 44, the staining tank 45, the staining tank 46, and the cleaning tank 47. Accordingly, the second transfer unit 740 can insert and pull out the smeared slides 11 one by one into and from each of the cleaning tank 44, the staining tank 45, the staining tank 46, and the cleaning tank 47.

Moreover, the second transfer unit 740 can move to positions above the second dryer 190 and the slide housing unit 200 (see FIG. 3). Accordingly, the second transfer unit 740 can insert and pull out the smears 12 one by one into and from the second dryer 190 and also insert the smears 12 one by one into the slide housing unit 200 (see FIG. 3).

The first transfer unit 730 and the second transfer unit 740 can convey separate smeared slides 11 or smears 12, respectively, in parallel. The operation range of the first transfer unit 730 and that of the second transfer unit 740 overlap each other in the cleaning tank 44 and the smeared slide 11 is handed over in the cleaning tank 44. The position of the handing-over may be a position other than the cleaning tank 44.

The second dryer 190 includes a housing portion 771 and an air blower 772. The housing portion 771 is a container open in an upper portion and can house smears 12 in the standing state. The air blower 772 can blow air into the housing portion 771. Air blowing by the air blower 772 dries the stained smears 12 housed in the housing portion 771.

(Conveyance Route of Slide)

Figure 6:
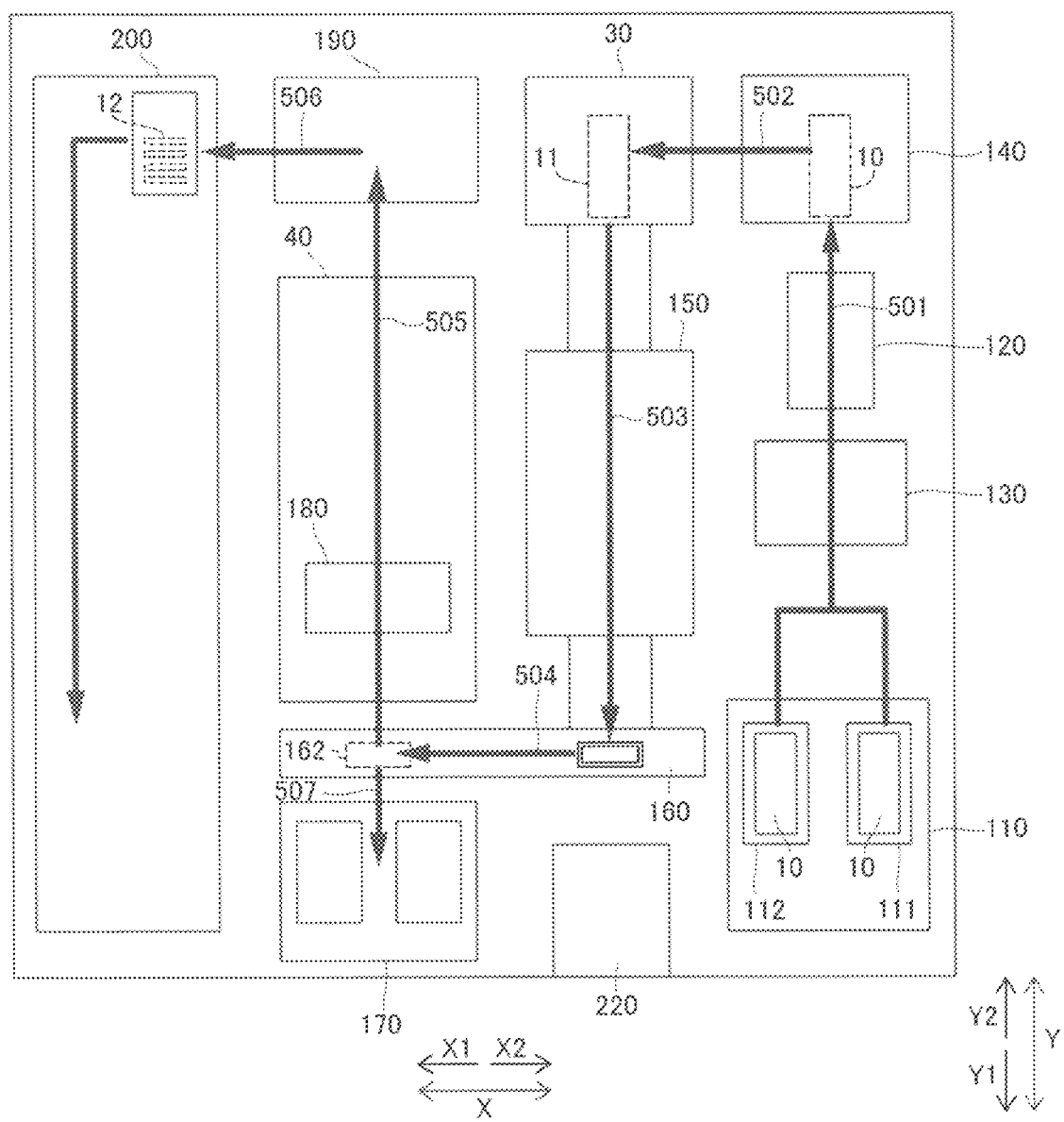
FIG. 6 is a diagram illustrating a conveyance route of a slide in a smear preparing apparatus according to an embodiment.

As illustrated in FIG. 6, a conveyance route of the slide 10, the smeared slide 11, and the smear 12 from the slide supplier 110 to the slide housing unit 200 extends along a route 501 extending in the Y2 direction, a route 502 extending in the X1 direction, a route 503 extending in the Y1 direction, a route 504 extending in the X1, a route 505 extending in the Y2 direction, and a route 506 extending in the X1 direction. When the staining processing is not performed, a conveyance route from the slide supplier 110 to the slide setting unit 170 is a route that extends along a route 507 extending in the Y1 direction, after the route 504. The conveyance of the slide 10, the smeared slide 11, and the smear 12 completes only with forward-direction conveyance and includes no reverse-direction conveyance.

(Fluid Circuit Unit)

Figure 7:
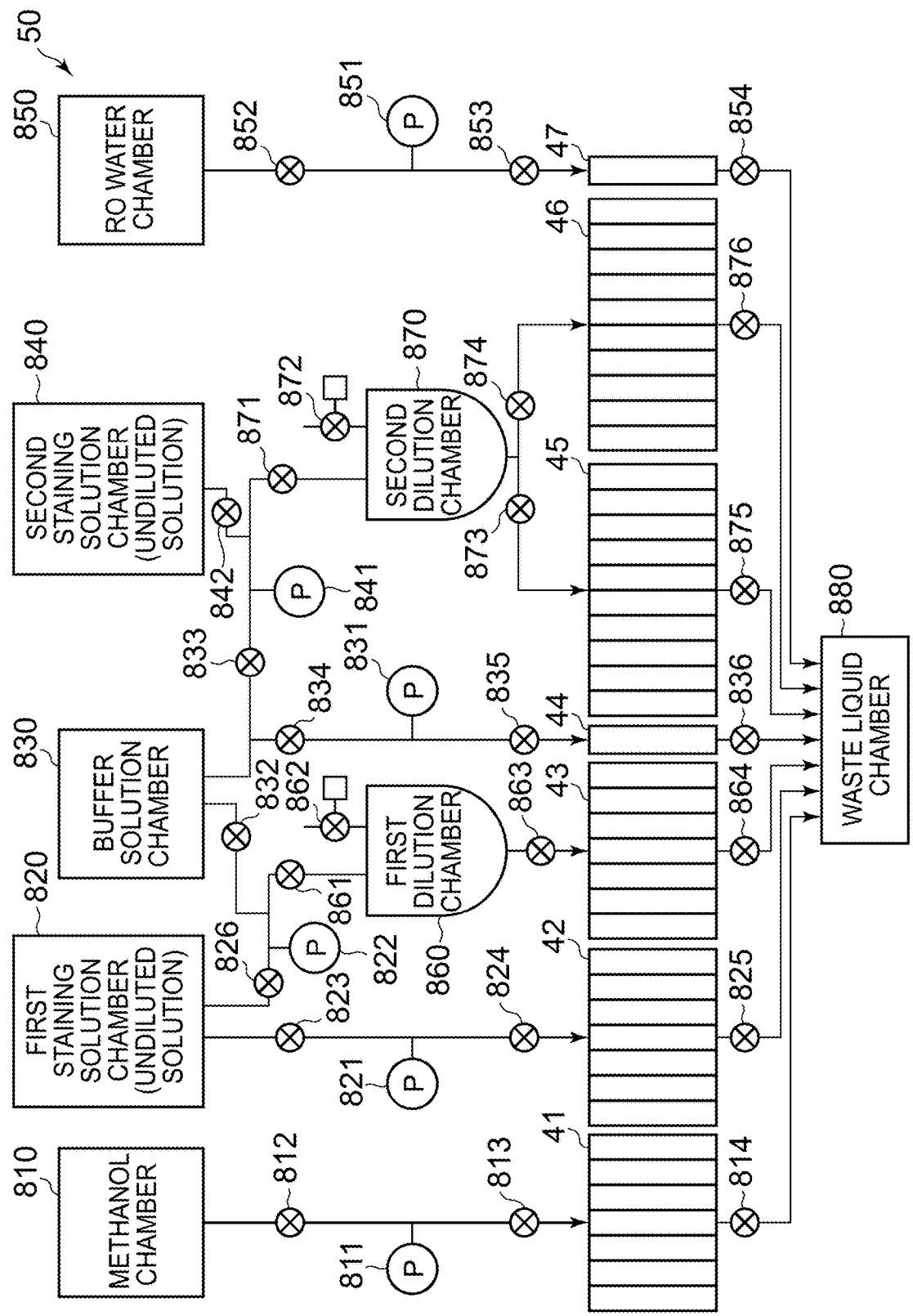
FIG. 7 is a diagram illustrating an outline of a fluid circuit unit in a smear preparing apparatus according to an embodiment.

FIG. 7 illustrates an outline of the fluid circuit unit 50 that supplies the staining solution or the cleaning liquid to each of the staining tanks 41, 42, 43, 45, and 46 and the cleaning tanks 44 and 47 in the staining unit 40.

The fluid circuit unit 50 includes a methanol chamber 810, a first staining solution chamber 820, a buffer solution chamber 830, a second staining solution chamber 840, a RO water chamber 850, a first dilution chamber 860, and a second dilution chamber 870. Moreover, the fluid circuit unit 50 includes pumps 811, 821, 822, 831, 841, and 851. Furthermore, the fluid circuit unit 50 includes valves 812, 813, 814, 823, 824, 825, 832, 833, 834, 835, 836, 842, 852, 853, 854, 861, 862, 863, 864, 871, 872, 873, 874, 875, and 876.

The pumps 811, 821, 822, and 841 which are metering pumps such as diaphragm pumps or syringe pumps determine a quantity of the staining solution and supply it to the staining tanks 41, 42, 43, 45, 46. When the staining solution is to be supplied as a diluted staining solution, in the first dilution chamber 860 or the second dilution chamber 870, an undiluted staining solution and a diluent are supplied to the dilution chamber and the undiluted staining solution is diluted to a predetermined concentration. The pumps 831 and 851 which are metering pumps determine a quantity of the cleaning liquid and supply it to the cleaning tanks 44 and 47.

The fluid circuit unit 50 supplies methanol stored in the methanol chamber 810 to the staining tank 41 by opening and closing the valves 812 and 813 and operating the pump 811. The fluid circuit unit 50 supplies an undiluted first staining solution stored in the first staining solution chamber 820 to the staining tank 42 by opening and closing the valves 823 and 824 and operating the pump 821. The first staining solution is selected from, for example, May-Gruenwald's solution or Wright's solution. The fluid circuit unit 50 supplies the undiluted first staining solution stored in the first staining solution chamber 820 and a buffer solution stored in the buffer solution chamber 830 to the first dilution chamber 860 by opening and closing the valves 826, 832, and 861 and operating the pump 822. A quantity of a diluted staining solution of the first staining solution is determined in the first dilution chamber 860. The fluid circuit unit 50 supplies the diluted staining solution of the first staining solution stored in the first dilution chamber 860 to the staining tank 43 by opening and closing the valve 863 and supplying positive pressure from a positive pressure source to the first dilution chamber 860 by switching the valve 862. The fluid circuit unit 50 supplies the buffer solution stored in the buffer solution chamber 830 to the cleaning tank 44 by opening and closing the valves 834 and 835 and operating the pump 831. The buffer solution (phosphate buffer) is used as the diluent of the staining solution and as the cleaning liquid.

The fluid circuit unit 50 supplies an undiluted second staining solution stored in the second staining solution chamber 840 and the buffer solution stored in the buffer solution chamber 830 to the second dilution chamber 870 by opening and closing the valves 833, 842, and 871 and operating the pump 841. The second staining solution is selected from Giemsa's solution or Wright's solution. A quantity of a diluted staining solution of the second staining solution is determined in the second dilution chamber 870. The fluid circuit unit 50 supplies the diluted staining solution of the second staining solution stored in the second dilution chamber 870 to the staining tank 45 or to both of the staining tank 45 and 46 by opening and closing the valves 873 and 874 and supplying positive pressure from a positive pressure source to the second dilution chamber 870 by switching the valve 872. The fluid circuit unit 50 supplies RO water (pure water) stored in the RO water chamber 850 to the cleaning tank 47 by opening and closing the valves 852 and 853 and operating the pump 851.

The fluid circuit unit 50 discharges liquid stored in the staining tank 41 to a waste liquid chamber 880 by opening and closing the valve 814. The fluid circuit unit 50 discharges liquid stored in the staining tank 42 to the waste liquid chamber 880 by opening and closing the valve 825. The fluid circuit unit 50 discharges liquid stored in the staining tank 43 to the waste liquid chamber 880 by opening and closing the valve 864. The fluid circuit unit 50 discharges liquid stored in the cleaning tank 44 to the waste liquid chamber 880 by opening and closing the valve 836. The fluid circuit unit 50 discharges liquid stored in the staining tank 45 to the waste liquid chamber 880 by opening and closing the valve 875. The fluid circuit unit 50 discharges liquid stored in the staining tank 46 to the waste liquid chamber 880 by opening and closing the valve 876. The fluid circuit unit 50 discharges liquid stored in the cleaning tank 47 to the waste liquid chamber 880 by opening and closing the valve 854.

Note that the fluid circuit unit 50 is configured to be capable of supplying cleaning liquid for tank cleaning to the staining tanks 41, 42, 43, 45, and 46 of the staining unit 40. The fluid circuit unit 50 can supply the cleaning liquid for tank cleaning individually to the staining tanks 41, 42, 43, 45, and 46 and the cleaning tanks 44 and 47 at timings such as shutdown of the smear preparing apparatus 100. For example, hypochlorite solution or the like can be employed as the cleaning liquid for tank cleaning. Moreover, methanol and a dilution buffer solution can be employed as the cleaning liquid.

(Main Flow)

Processing of a main flow performed by the controller 20 of the smear preparing apparatus 100 is described with reference to FIG. 8. When the user activates the smear preparing apparatus 100, the controller 20 executes the processing of the main flow illustrated in FIG. 8.

In step S11, the controller 20 controls the display unit 22 such that the display unit 22 switches to a standby state of receiving a mode selection in activation. Specifically, the controller 20 causes the display unit 22 to display a mode selection screen in activation illustrated in FIGS. 14 and 16. In the mode selection screen in activation, the user can select staining tank ON or staining tank OFF. In staining tank ON, the staining processing by the staining unit 40 can be performed. Meanwhile, in staining tank OFF, the staining processing by the staining unit 40 cannot be performed. In step S12, the controller 20 determines whether staining tank ON is selected. The processing proceeds to step S13 when staining tank ON is selected and proceeds to step S16 when staining tank OFF is selected. In this case, the operation mode to perform the staining processing is set in response to the selection of staining tank ON by the user. Meanwhile, the operation mode to not perform the staining processing is set in response to the selection of staining tank OFF by the user.

In step S13, the controller 20 controls the fluid circuit unit 50 such that the fluid circuit unit 50 performs staining solution filling processing of supplying the staining solution to the staining tanks 41, 42, 43, 45, and 46 of the staining unit 40. The staining solution is supplied to each of the staining tanks 41, 42, 43, 45, and 46 by the staining solution filling processing. Note that the processing of filling the staining solution may be performed in parallel with processing of steps S14 and S15 or performed after step S15. Moreover, the smearing processing and the printing processing which use no staining unit 40 can be performed in parallel during the filling of the staining solution.

When the staining solution filling processing is completed, the smear preparing apparatus 100 switches to a standby state of receiving a user mode selection. Specifically, in step S14, the controller 20 causes the display unit 22 to display a mode selection screen illustrated in FIG. 17. In the case of staining tank ON, the user can select the smearing staining mode, the smearing mode, the printing mode, and the staining mode on the mode selection screen. When the user inputs a mode selection for one of the modes and inputs OK by using the manipulation unit 21, the mode selection is received. When the user inputs cancel, the display of the mode selection screen is canceled and switches to a main menu screen. In step S15 of FIG. 8, the controller 20 receives a user mode selection manipulation on the mode selection screen. The processing proceeds to step S18 when the user selects the smearing staining mode, proceeds to step S19 when the user selects the staining mode, proceeds to step S20 when the user selects the smearing mode, and proceeds to step S21 when the user selects the printing mode.

In step S16, the controller 20 causes the display unit 22 to display a mode selection screen illustrated in FIG. 15. In the case of staining tank OFF, the user can select the smearing mode or the printing mode on the mode selection screen. When the user inputs a mode selection for one of the modes and inputs OK by using the manipulation unit 21, the mode selection is received. When the user inputs cancel, the display of the mode selection screen is canceled and switches to the main menu screen. In step S17 of FIG. 8, the controller 20 receives a user mode selection manipulation on the mode selection screen. The processing proceeds to step S20 when the user selects the smearing mode and proceeds to step S21 when the user selects the printing mode.

In step S18, the controller 20 starts operation control in the smearing staining mode. In step S19, the controller 20 starts operation control in the staining mode. In step S20, controller 20 starts operation control in the smearing mode. In step S21, controller 20 starts operation control in the printing mode.

When a shut-down button is inputted after completion of the operation of the executed mode, the controller 20 performs shut-down processing in step S22 and terminates the processing.

(Smearing Staining Mode)

Figure 8:
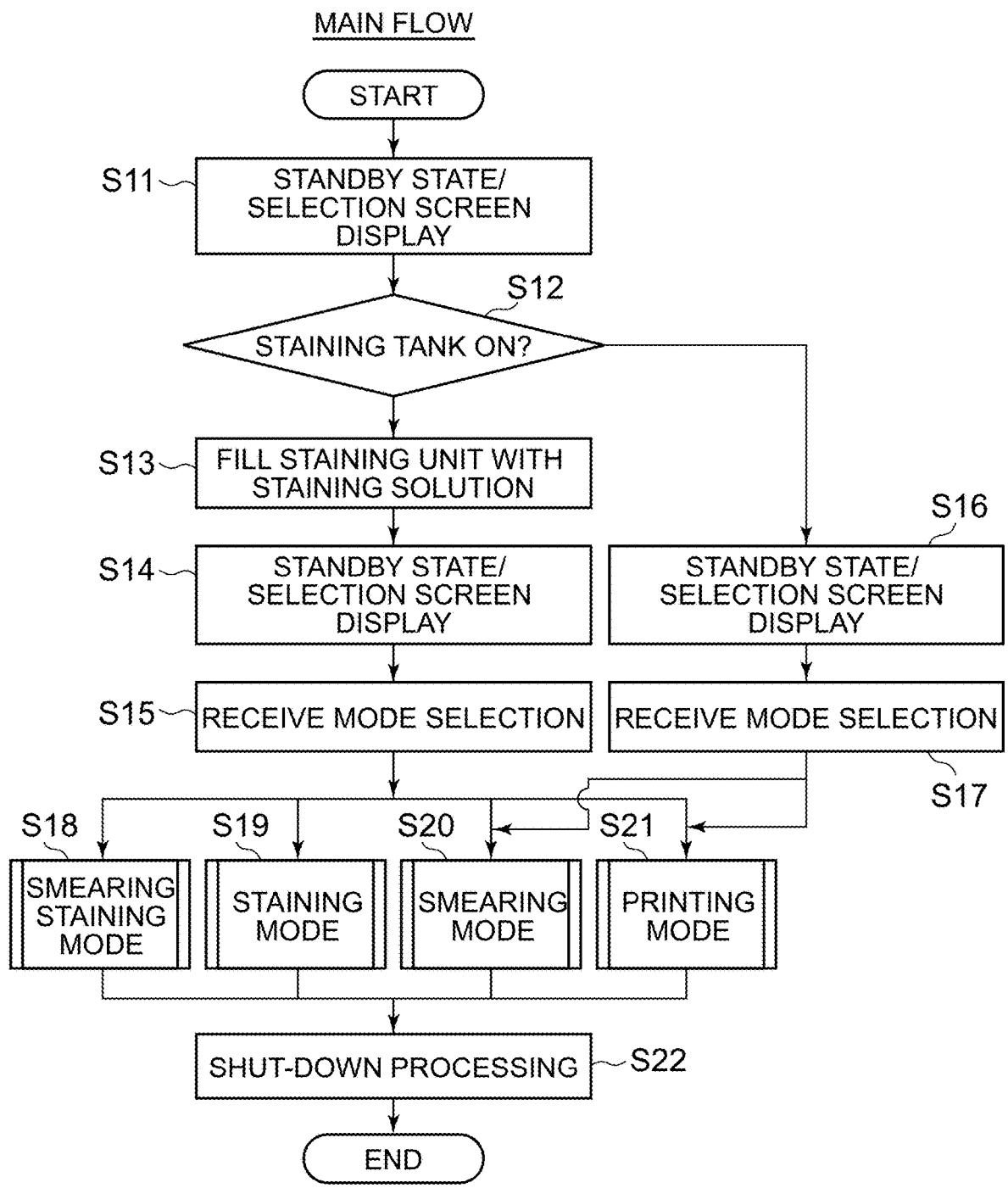
FIG. 8 is a flow diagram illustrating a main flow of a smear preparing apparatus according to an embodiment.
Figure 9:
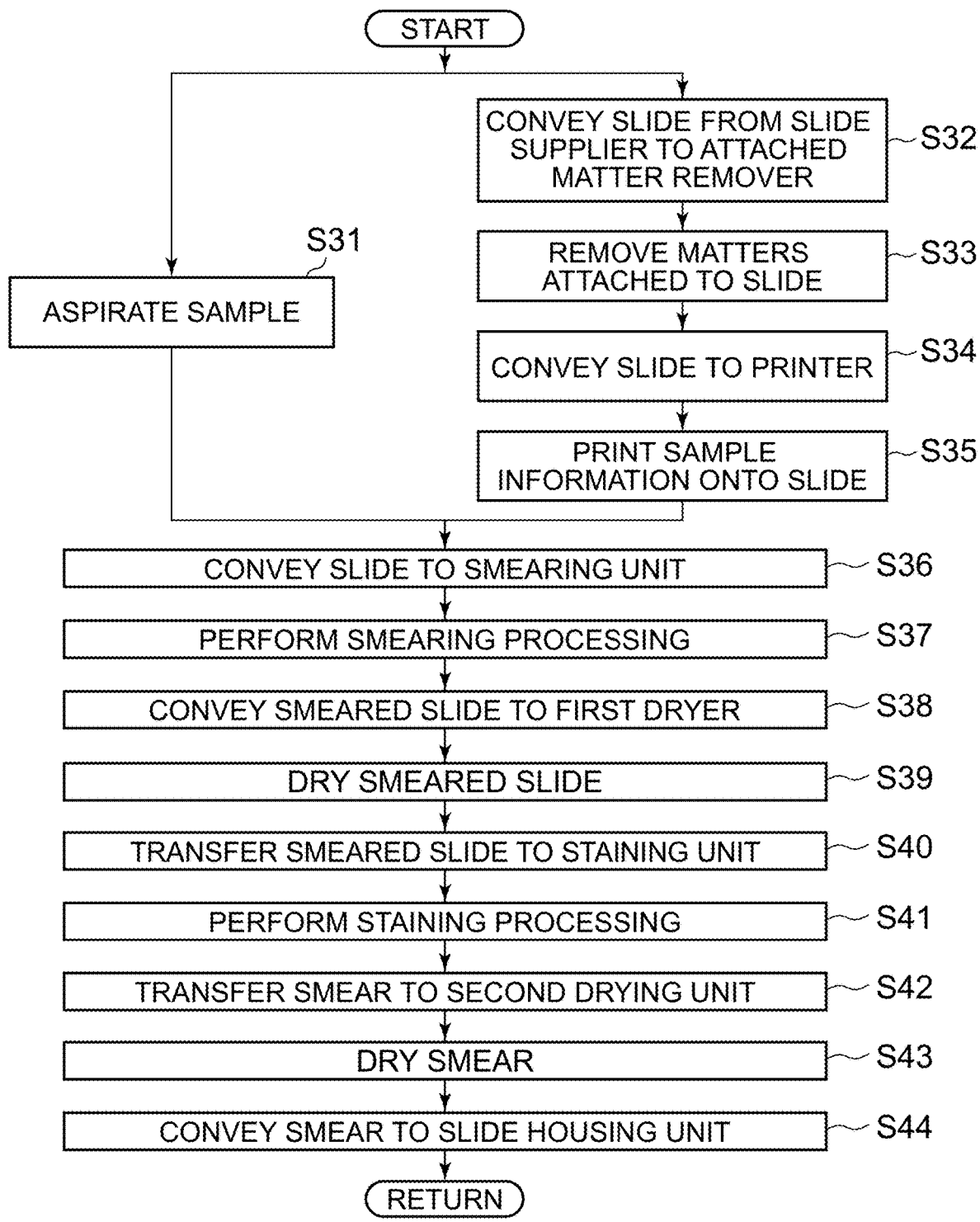
FIG. 9 is a flow diagram illustrating processing in a smearing staining mode in a smear preparing apparatus according to an embodiment.

The smearing staining mode illustrated in step S18 of FIG. 8 is described with reference to FIG. 9.

When the smearing staining mode starts, the user can give an instruction of starting operations in the smearing staining mode to the smear preparing apparatus 100 by pressing a start button provided at a predetermined position of the smear preparing apparatus 100. The user sets the sample rack housing the sample containers in the sample conveyor 210 and presses the start button to give the start instruction of the smearing staining mode. The controller 20 receives the start instruction of the smearing staining mode and starts the operations in the smearing staining mode. Note that the reception of operation start instruction is the same in the operation modes other than the smearing staining mode such as the staining mode, the smearing mode, and the printing mode.

In step S31, the controller 20 controls the sample conveyor 210 and the aspirator 220 such that the aspirator 220 aspirates the sample from the sample container set in the sample conveyor 210 by the user.

The controller 20 controls the sample conveyor 210 such that one of the sample containers held in the sample rack on the sample conveyor 210 is arranged at the take-in position. The controller 20 controls the aspirator 220 such that the aspirator 220 aspirates the sample in the sample container conveyed to the take-in position. The sample aspirated by the aspirator 220 is sent to the smearing unit 30.

The controller 20 executes processing of steps S32 to S35 in parallel with step S31. In step S32, the controller 20 controls the slide supplier 110 such that the slide supplier 110 sends out the unused slide 10 onto the transfer mechanism 120. Then the controller 20 controls the transfer mechanism 120 holding the slide 10 such that the transfer mechanism 120 moves to the attached matter remover 130.

In step S33, the controller 20 operates the attached matter remover 130 and causes it to remove attached matters on the surface of the slide 10. In step S34, the controller 20 controls the transfer mechanism 120 holding the slide 10 such that the transfer mechanism 120 moves to the printer 140. In step S35, the controller 20 controls the printer 140 such that the printer 140 executes the printing processing of printing the sample information in the print region 14 of the slide 10.

Next, in step S36, the controller 20 controls the transfer mechanism 120 holding the slide 10 such that the transfer mechanism 120 moves to the smearing unit 30. In step S37, the controller 20 controls the smearing unit 30 such that the smearing unit 30 executes the smearing processing of smearing the sample in the smear region 13 of the slide 10. The smeared slide 11 is thereby prepared.

Next, in step S38, the controller 20 performs control such that the smeared slide 11 subjected to the printing and the smearing is conveyed from the smearing unit 30 to the first dryer 150. In step S39, the controller 20 controls the first dryer 150 such that the first dryer 150 executes the processing of drying the sample by blowing air to the smear region 13 of the smeared slide 11.

Next, in step S40, the controller 20 performs control of conveying the smeared slide 11 subjected to the printing processing, the smearing processing, and the drying processing to the staining unit 40. Specifically, the controller 20 performs control such that the smeared slide 11 subjected to the drying processing is handed over from the first dryer 150 to the slide conveyor 160. The controller 20 controls the slide conveyor 160 such that the slide conveyor 160 conveys the smeared slide 11 to the take-out position 162. When the smeared slide 11 reaches the take-out position 162, the controller 20 controls the first transfer unit 730 of the transfer unit 180 such that the first transfer unit 730 grips the smeared slide 11 at the take-out position 162 and takes the smeared slide 11 out from the slide conveyor 160 to transfer the smeared slide 11 to the staining unit 40. The smeared slide 11 is thereby transferred to the staining unit 40.

In step S41, the controller 20 controls the transfer unit 180 and the fluid circuit unit 50 such that the staining unit 40 executes the staining processing. The smear 12 is thereby prepared.

In step S42, the controller 20 controls the second transfer unit 740 of the transfer unit 180 such that the second transfer unit 740 transfers the smear 12 being the smeared slide 11 subjected to the staining processing, from the staining unit 40 to the second dryer 190. In step S43, the controller 20 controls the second dryer 190 such that the second dryer 190 executes the processing of drying the smear 12 by blowing air to the smear 12.

In step S44, the controller 20 controls the second transfer unit 740 and the slide housing unit 200 such that the dried smear 12 is transferred from the second dryer 190 to the slide housing unit 200.

The printing processing, the smearing processing, and the staining processing are thereby sequentially performed on the unused slide 10 and the prepared smear 12 (slide 10 subjected to processing) is housed in the slide housing unit 200. Moreover, the controller 20 repeats the aforementioned processing of the smearing staining mode such that the printing processing, the smearing processing, and the staining processing are sequentially performed on the unused slides 10 by using the aspirated samples one by one. Accordingly, the staining processing in the staining unit 40 is executed one by one on the smeared slides 11 transferred by the transfer unit 180 at predetermined time intervals depending on an operation cycle of the smear preparing apparatus 100.

(Staining Mode)

Figure 10:
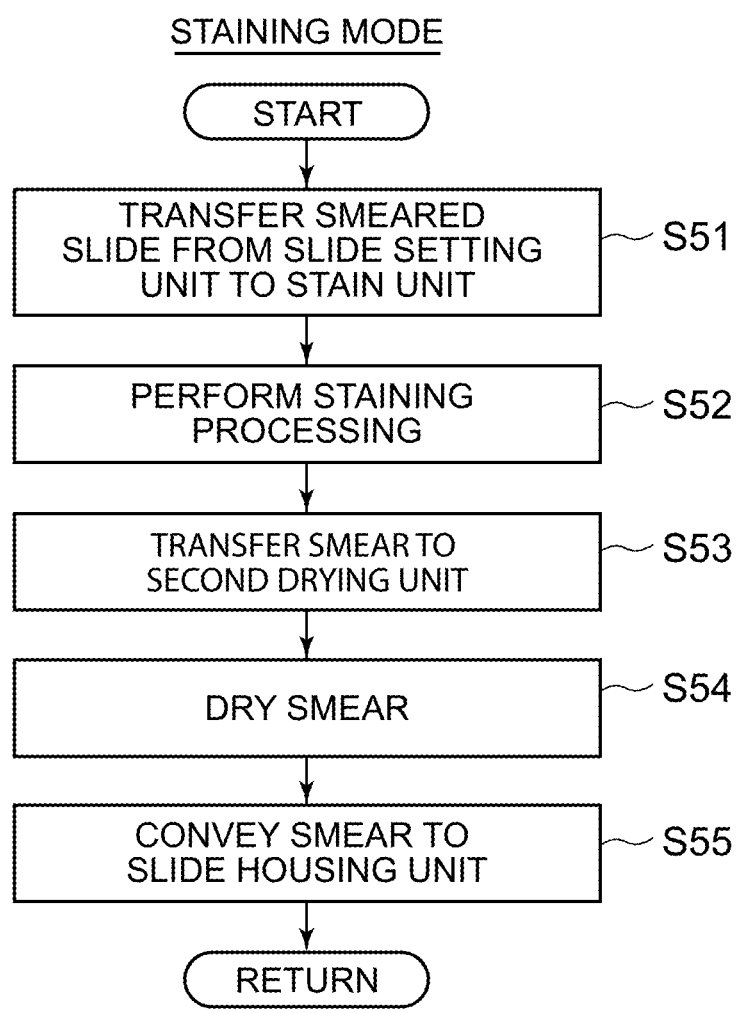
FIG. 10 is a flow diagram illustrating processing in a staining mode in a smear preparing apparatus according to an embodiment.

The staining mode illustrated in step S19 of FIG. 8 is described with reference to FIG. 10.

In the staining mode, the user sets a slide housing container housing the smeared slides 11 subjected to smearing into the slide setting unit 170 and inputs an instruction of starting operations in the staining mode. When the staining mode starts, in step S51, the controller 20 controls the first transfer unit 730 such that the first transfer unit 730 takes out the smeared slides 11 to be conveyed one by one from the slide setting unit 170 and transfers the smeared slide 11 to the staining unit 40.

In step S52, the controller 20 controls the first transfer unit 730 and the fluid circuit unit 50 such that the staining processing is performed on the smeared slide 11 transferred by the first transfer unit 730 in the staining unit 40. The smear 12 is thereby prepared.

In step S53, the controller 20 controls the second transfer unit 740 of the transfer unit 180 such that the second transfer unit 740 transfers the smear 12 being the smeared slide 11 subjected to the staining processing, from the staining unit 40 to the second dryer 190. In step S54, the controller 20 controls the second dryer 190 such that the second drying unit 190 executes the processing of drying the smear 12 by blowing air to the smear 12.

In step S55, the controller 20 controls the second transfer unit 740 and the slide housing unit 200 such that the dried smear 12 is transferred from the second dryer 190 to the slide housing unit 200.

(Smearing Mode)

Figure 11:
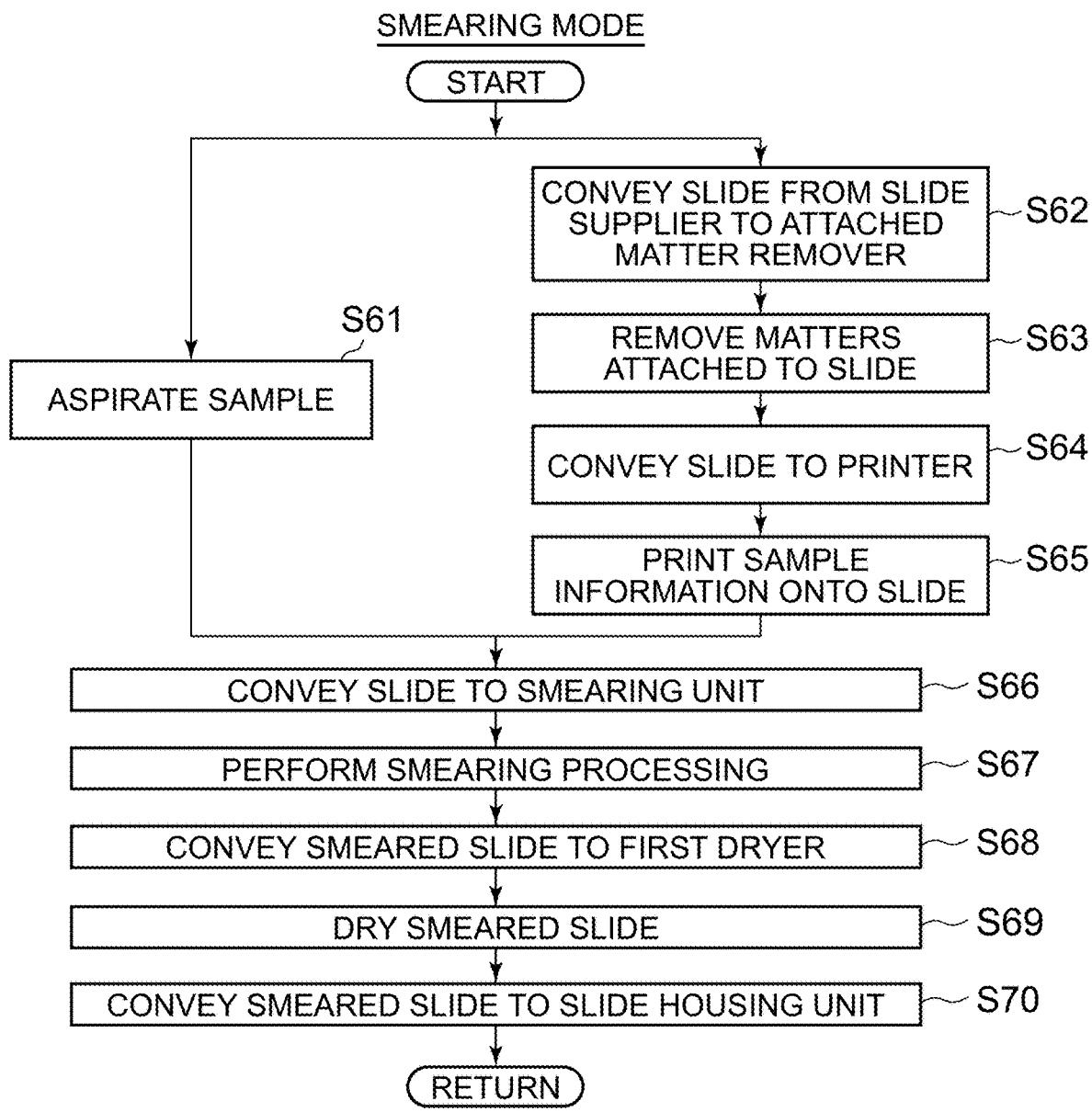
FIG. 11 is a flow diagram illustrating processing in a smearing mode in a smear preparing apparatus according to an embodiment.

The smearing mode illustrated in step S20 of FIG. 8 is described with reference to FIG. 11.

In the smearing mode, the user sets the sample rack housing the sample containers into the sample conveyor 210 and inputs an instruction of starting operations of the smearing mode. When the smearing mode starts, in step S61, the controller 20 controls the sample conveyor 210 and the aspirator 220 such that the aspirator 220 aspirates the sample from the sample container set in the sample conveyor 210 by the user.

The controller 20 controls the sample conveyor 210 such that one of the containers held in the sample rack on the sample conveyor 210 is arranged at the take-in position. The controller 20 controls the aspirator 220 such that the aspirator 220 aspirates the sample in the sample container conveyed to the take-in position. The sample aspirated by the aspirator 220 is sent to the smearing unit 30.

The controller 20 executes processing of steps S62 to S65 in parallel with step S61. In step S62, the controller 20 controls the slide supplier 110 such that the slide supplier 110 sends out the unused slide 10 onto the transfer mechanism 120. Then the controller 20 controls the transfer mechanism 120 holding the slide 10 such that the transfer mechanism 120 moves to the attached matter remover 130.

In step S63, the controller 20 operates the attached matter remover 130 and causes it to remove attached matters on the surface of the slide 10. In step S64, the controller 20 controls the transfer mechanism 120 holding the slide 10 such that the transfer mechanism 120 moves to the printer 140. In step S65, the controller 20 controls the printer 140 such that the printer 140 executes the printing processing of printing the sample information in the print region 14 of the slide 10.

Next, in step S66, the controller 20 controls the transfer mechanism 120 holding the slide 10 such that the transfer mechanism 120 moves to the smearing unit 30. In step S67, the controller 20 controls the smearing unit 30 such that the smearing unit 30 executes the smearing processing of the smearing the sample in the smear region 13 of the slide 10. The smeared slide 11 is thereby prepared.

Next, in step S68, the controller 20 performs control such that the smeared slide 11 subjected to the printing and the smearing is conveyed from the smearing unit 30 to the first dryer 150. In step S69, the controller 20 controls the first dryer 150 such that the first dryer 150 executes processing of drying the sample by blowing air to the smear region 13 of the smeared slide 11.

Next, in step S40, the controller 20 performs control of conveying the smeared slide 11 subjected to the printing processing, the smearing processing, and the drying processing to the slide housing unit 200. Specifically, the controller 20 performs control such that the smeared slide 11 subjected to the drying processing is handed over from the first dryer 150 to the slide conveyor 160. The controller 20 controls the slide conveyor 160 such that the slide conveyor 160 conveys the smeared slide 11 to the take-out position 162. When the smeared slide 11 reaches the take-out position 162, the controller 20 controls the first transfer unit 730 of the transfer unit 180 such that the first transfer unit 730 grips the smeared slide 11 at the take-out position 162 and takes the smeared slide 11 out from the slide conveyor 160 to transfer the smeared slide 11 to the slide housing unit 200.

(Printing Mode)

Figure 12:
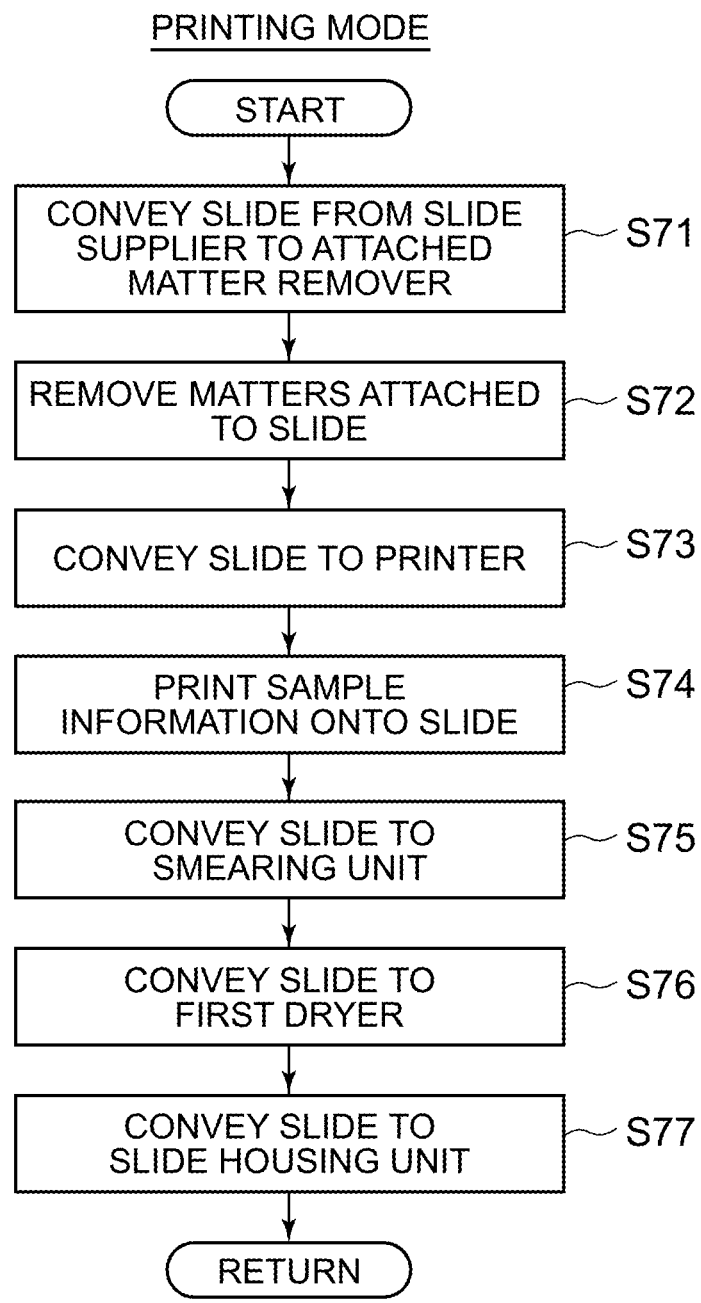
FIG. 12 is a flow diagram illustrating processing in a printing mode in a smear preparing apparatus according to an embodiment.

The printing mode illustrated in step S21 of FIG. 8 is described with reference to FIG. 12.

In the printing mode, the user inputs an instruction of starting operations of the printing mode. When the printing mode starts, in step S71, the controller 20 controls the slide supplier 110 such that the slide supplier 110 sends out the unused slide 10 onto the transfer mechanism 120. Then the controller 20 controls the transfer mechanism 120 holding the slide 10 such that the transfer mechanism 120 moves to the attached matter remover 130.

In step S72, the controller 20 operates the attached matter remover 130 and causes it to remove attached matters on the surface of the slide 10. In step S73, the controller 20 controls the transfer mechanism 120 holding the slide 10 such that the transfer mechanism 120 moves to the printer 140. In step S74, the controller 20 controls the printer 140 such that the printer 140 executes the printing processing of printing the sample information in the print region 14 of the slide 10.

Next, in step S75, the controller 20 controls the transfer mechanism 120 holding the slide 10 such that the transfer mechanism 120 moves to the smearing unit 30. Note that, in this case, no smearing processing is performed in the smearing unit 30. In step S76, the controller 20 performs control such that the slide 10 subjected to the printing is conveyed from the smearing unit 30 to the first dryer 150. Note that, in this case, no drying processing is performed in the first dryer 150.

Next, in step S77, the controller 20 controls the second transfer unit 740 such that the second transfer unit 740 transfers the slide 10 subjected to the printing processing to the slide housing unit 200. Specifically, the controller 20 performs control such that the slide 10 is handed over from the first dryer 150 to the slide conveyor 160. The controller 20 controls the slide conveyor 160 such that the slide conveyor 160 conveys the slide 10 to the take-out position 162. When the slide 10 reaches the take-out position 162, the controller 20 controls the first transfer unit 730 of the transfer unit 180 such that the first transfer unit 730 grips the slide 10 at the take-out position 162 and takes the slide 10 out from the slide conveyor 160 to transfer the slide 10 to the slide housing unit 200.

(Shutdown Processing)

Figure 13:
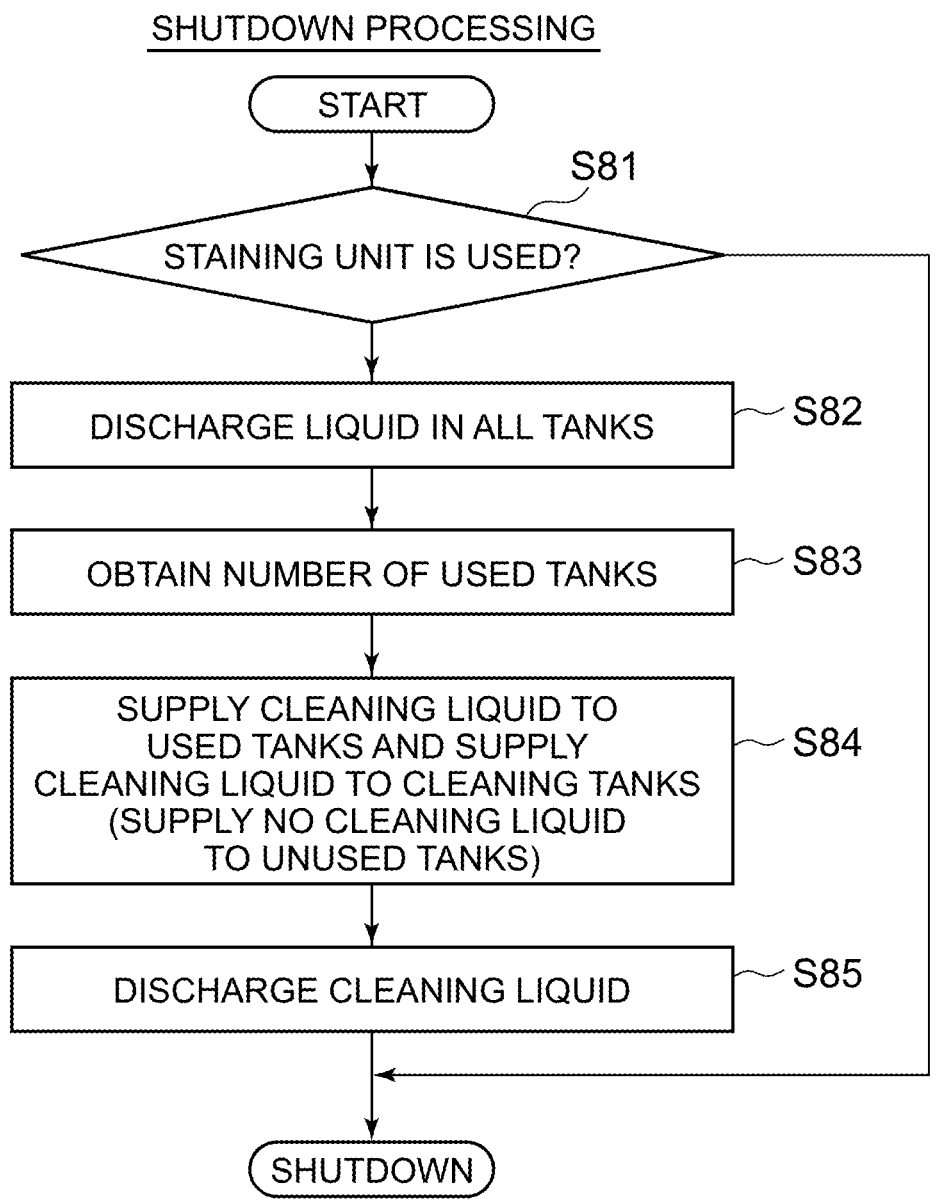
FIG. 13 is a flow diagram illustrating shutdown processing in a smear preparing apparatus according to an embodiment.

Next, control processing of a cleaning operation in shutdown processing illustrated in step S22 of FIG. 8 is described with reference to FIG. 13.

In step S81, the controller 20 determines whether the staining unit 40 is used. Specifically, the controller 20 determines whether the staining solution is accommodated in the staining unit 40. The control processing of the cleaning operation proceeds to step S82 when the staining unit 40 is used, and is terminated when the staining unit 40 is not used.

In step S82, the controller 20 controls the fluid circuit unit 50 such that the fluid circuit unit 50 discharges the liquids in all tanks of the staining unit 40. The controller 20 opens the valves 814, 825, 864, 836, 875, 876, and 854 between the waste liquid chamber 880 and the respective staining tanks 41, 42, 43, 45, and 46 and cleaning tanks 44 and 47 to discharge the liquids in the tanks to the waste liquid chamber 880.

In step S83, the controller 20 determines the staining tanks used in the staining processing. Specifically, the controller 20 determines the staining tanks used in the staining processing and the staining tanks not used in the staining processing before the execution of the shutdown processing by the smear preparing apparatus 100, among the staining tanks 41, 42, 43, 45, and 46.

In step S84, the controller 20 controls the fluid circuit unit 50 such that the cleaning liquid for tank cleaning is supplied to the staining tanks used in the staining processing among the staining tanks 41, 42, 43, 45, and 46. Meanwhile, the controller 20 causes the fluid circuit unit 50 to supply no cleaning liquid to the staining tanks not used in the staining processing among the staining tanks 41, 42, 43, 45, and 46.

Thereafter, in step S85, the controller 20 controls the fluid circuit unit 50 such that the fluid circuit unit 50 discharges the supplied cleaning liquid from the tanks of the staining unit 40. The controller 20 causes the fluid circuit unit 50 to open the valves 814, 825, 864, 836, 875, 876, and 854 between the waste liquid chamber 880 and the respective staining tanks 41, 42, 43, 45, and 46 and cleaning tanks 44 and 47 to discharge the cleaning liquid in the tanks to the waste liquid chamber 880. Then the control processing of the cleaning operation in the shutdown processing is terminated.

(Additional Matters)

Description is given below of matters including a modified example of the reception of operation mode selection.

A sample processing apparatus that operates in the operation modes according to an embodiment includes a sample processor that performs processing on samples and a controller.

Figure 18:
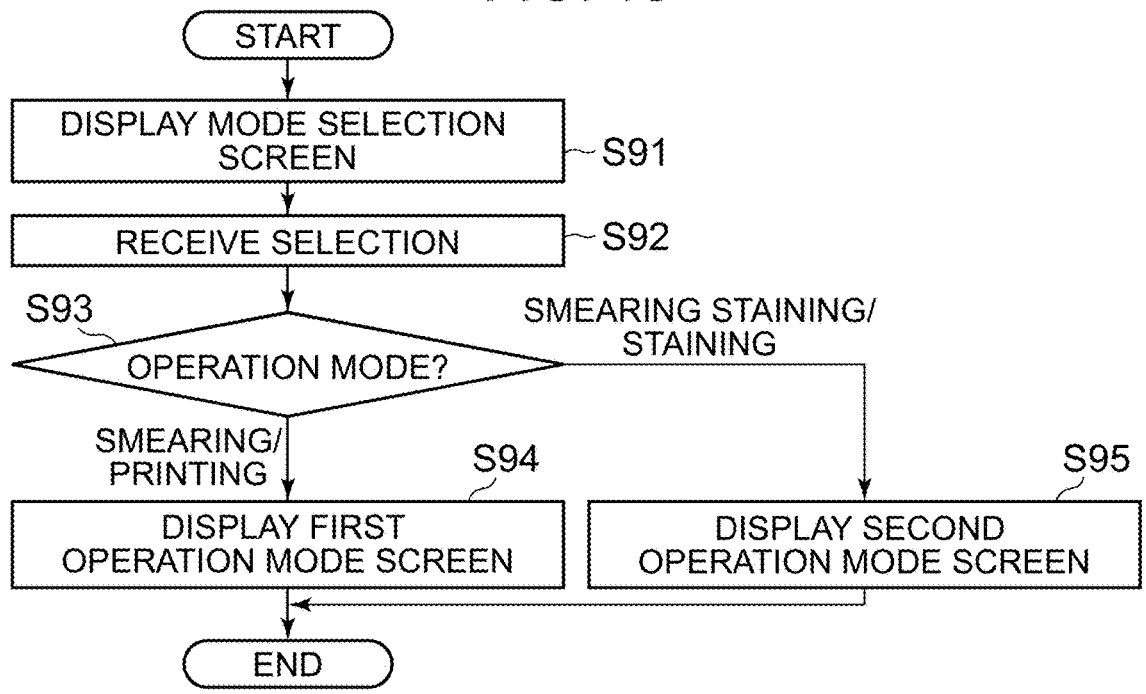
FIG. 18 is a flow diagram illustrating processing of a sample processing apparatus according to a modified example of an embodiment.

Processing of a main flow performed by the controller of the sample processing apparatus is described with reference to FIG. 18. When the user activates the sample processing apparatus, the controller executes the processing of the main flow illustrated in FIG. 18.

Figure 19:
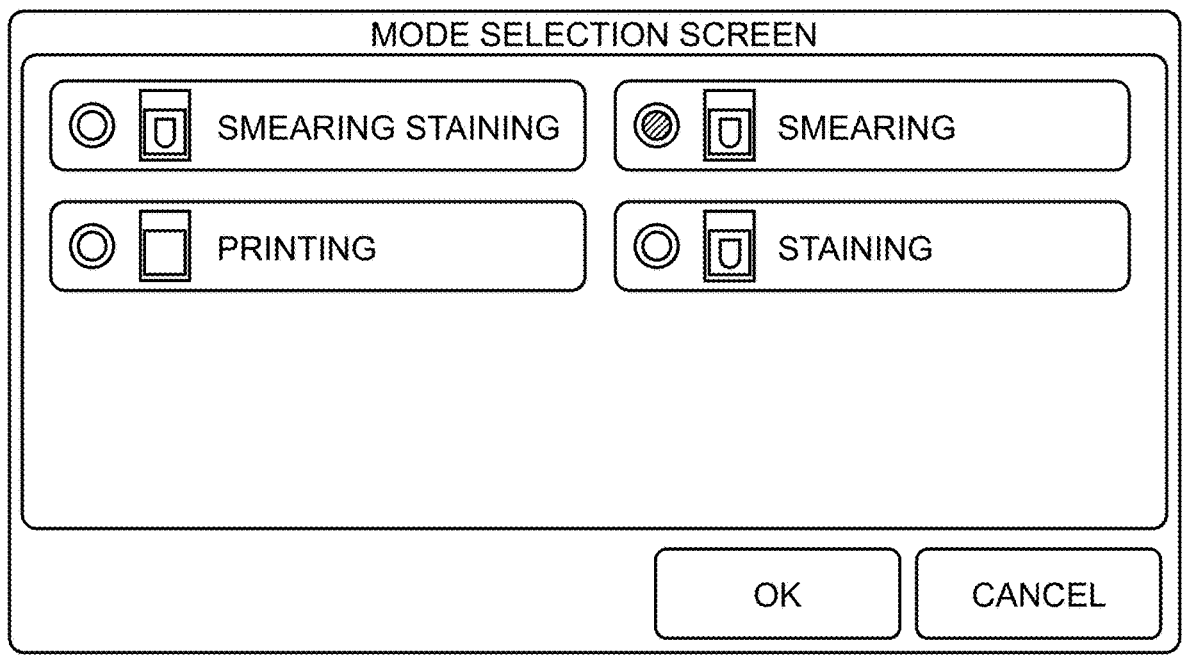
FIG. 19 is a diagram illustrating a fifth example of a selection screen in mode selection in a sample processing apparatus according to a modified example of an embodiment.

In step S91, the controller controls a display unit such that the display unit displays a mode selection screen in activation illustrated in FIG. 19. The mode selection screen in activation is illustrated in a state where the user can select one of the operation modes of the smearing staining mode, the smearing mode, the printing mode, and the staining mode. Note that step S91 corresponds to step S11 of FIG. 8.

In step S92, the controller executes selection reception for the operation modes through the selection screen. When the selection reception is executed, in step S93, the controller receives the selection of one of the operation modes of the smearing staining mode, the smearing mode, the printing mode, and the staining mode from the user. Note that step S93 corresponds to step S12 of FIG. 8.

The processing proceeds to step S94 when any of the operation modes of the smearing mode and the printing mode is selected, and proceeds to step S95 when any of the operation modes of the smearing staining mode and the staining mode is selected. Note that step S94 corresponds to step S14 of FIG. 8 and step S95 corresponds to step S16 of FIG. 8.

Figure 20:
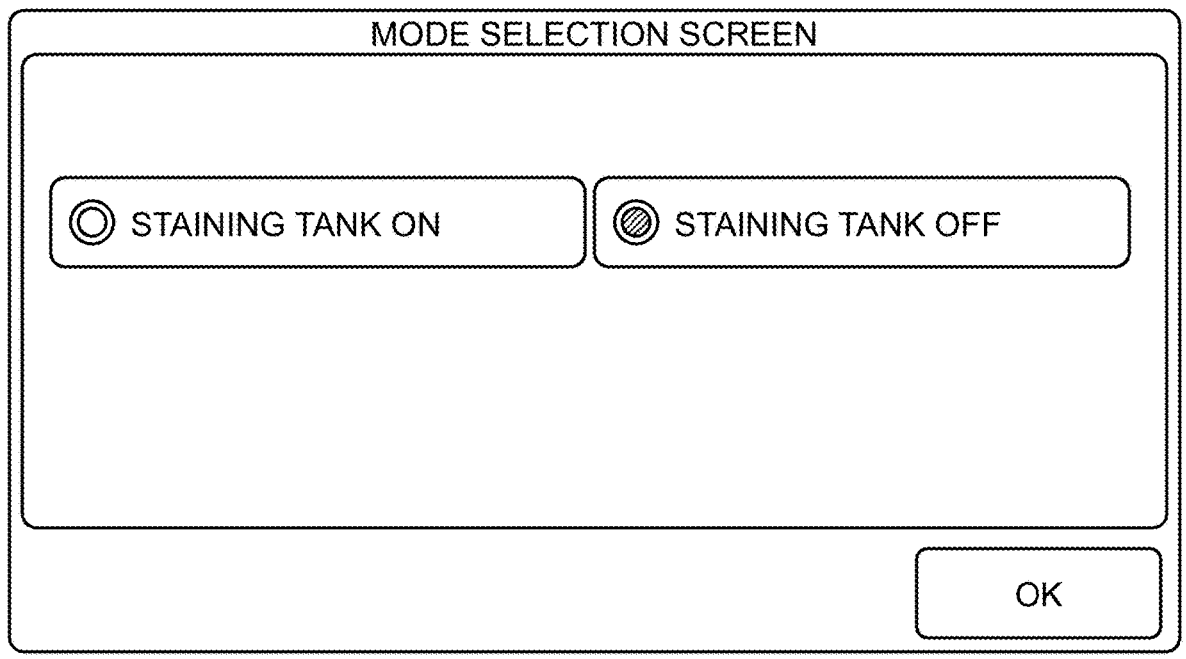
FIG. 20 is a diagram illustrating a sixth example of a selection screen in mode selection in a sample processing apparatus according to a modified example of an embodiment.

In step S94, the controller controls the display unit such that the display unit displays a mode selection screen illustrated in FIG. 20. In the mode selection screen displayed in step S94, the controller can receive one of the operation modes of staining tank ON and staining tank OFF from the user.

Figure 21:
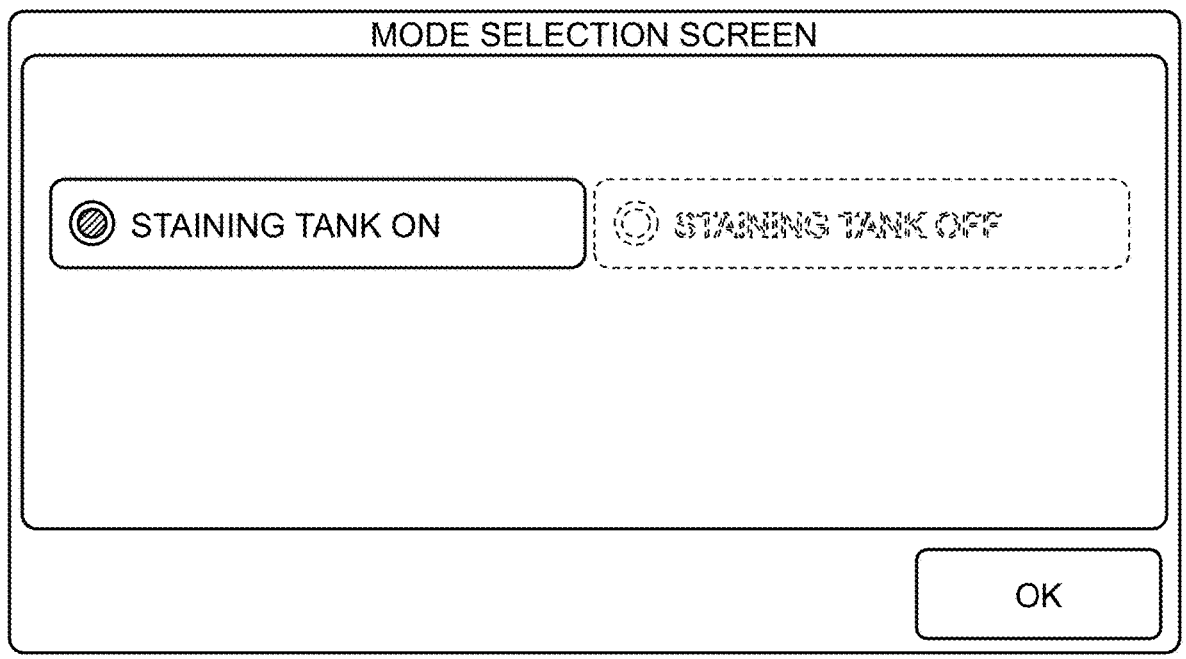
FIG. 21 is a diagram illustrating a seventh example of a selection screen in mode selection in a sample processing apparatus according to a modified example of an embodiment.

In step S95, the controller controls the display unit such that the display unit displays a mode selection screen illustrated in FIG. 21. In the mode selection screen displayed in step S95, the controller can receive only the selection of the operation mode of staining tank ON from the user, and prohibits the user from selecting the operation mode of staining tank OFF by graying-out this operation mode.

The controller is thus configured to: execute a first presentation step of presenting operation modes while causing selection thereof; when a first operation mode is selected from the presented operation modes, execute a second presentation step of presenting operation modes relating to the first operation mode while causing selection thereof; when a second operation mode is selected from the presented operation modes, execute a third presentation step of presenting at least one of the operation modes relating to the first operation mode while prohibiting selection thereof.

In this case, "present" is processing executed by a program that is run when the controller controls operations of the units in the sample processing apparatus. An example of this processing is the aforementioned processing of causing the display unit to display the mode selection screen. Note that "present" is not limited to screen display processing such as causing the display unit to display the mode selection screen and may be notification processing of notifying the user by using voice or sound.

Moreover, "prohibit" is processing executed by the program that is run when the controller controls operations of the units in the sample processing apparatus. An example of this processing is the aforementioned processing of prohibiting the user from selecting the operation mode of staining tank OFF by graying-out this operation mode. Note that "prohibit" is not limited to the processing of prohibiting the user from selecting a certain operation mode by graying-out this operation mode and may be processing of not displaying an option of the operation mode on the display unit.

Such a configuration allows the user to select an appropriate operation mode depending on a selected operation mode and can thus improve user operability.

Note that, in the description of an embodiment, the sample processor of the sample processing apparatus includes a smearing unit that prepares smeared slides by smearing samples onto slides, a staining unit that is capable of housing smeared slides and that performs staining processing by accommodating a staining solution used to stain the samples on the housed smeared slides, and a fluid circuit unit that supplies a staining solution to the staining unit.

Figure 14:
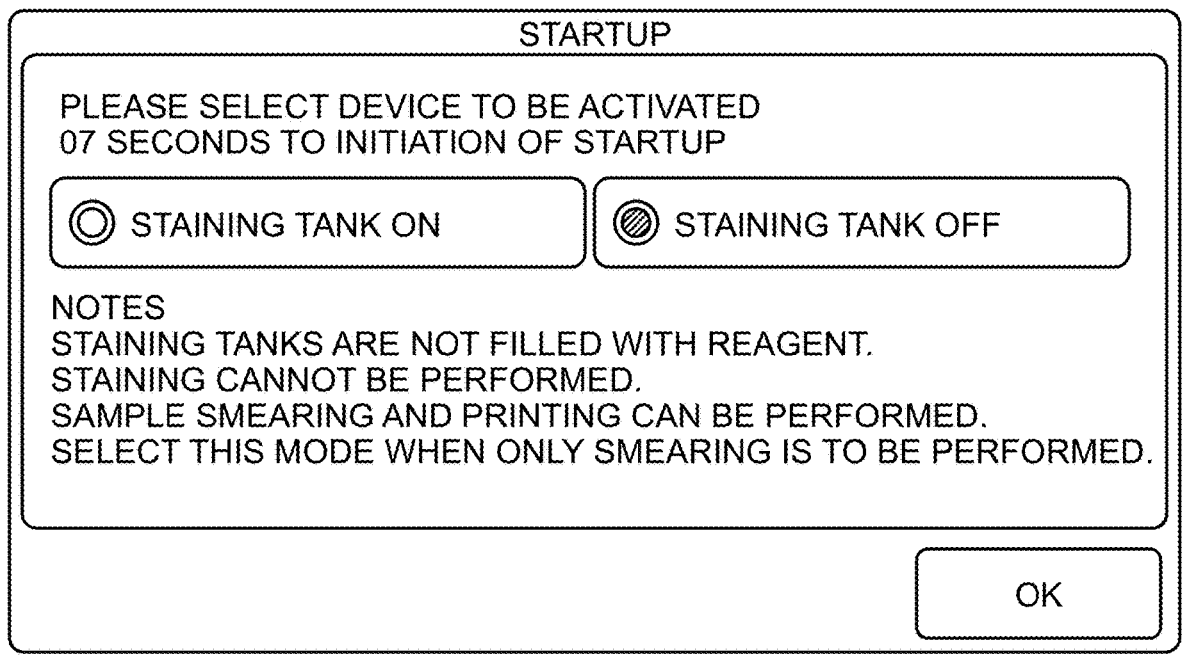
FIG. 14 is a diagram illustrating a first example of a selection screen in mode selection in a smear preparing apparatus according to an embodiment.
Figure 16:
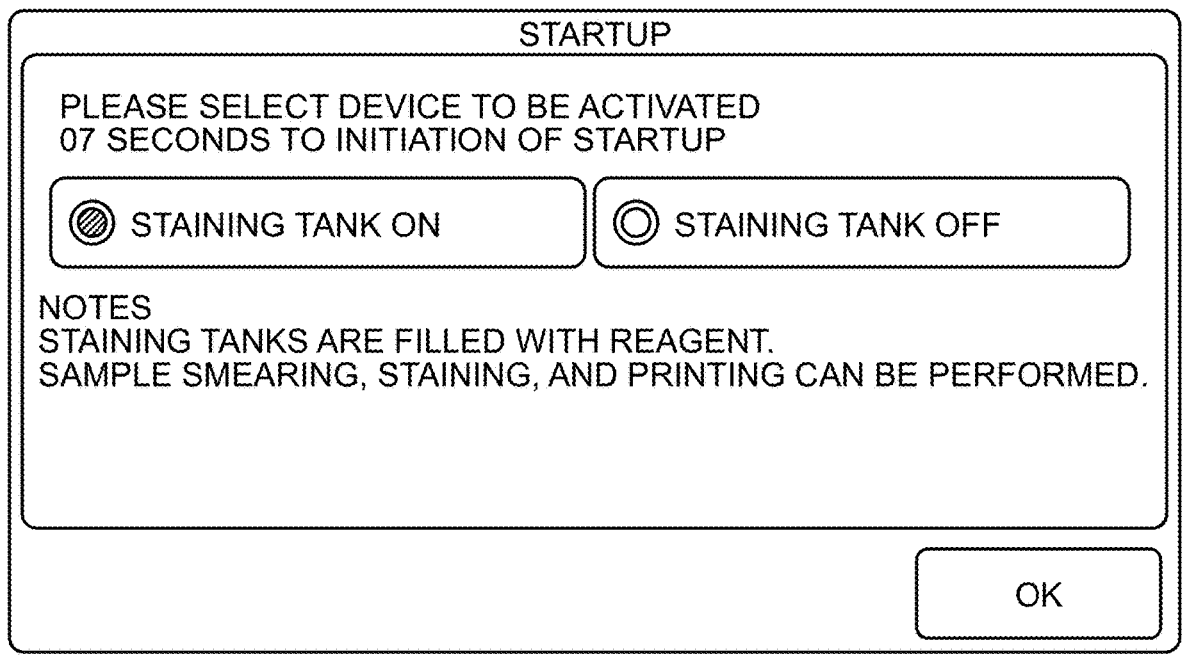
FIG. 16 is a diagram illustrating a third example of a selection screen in mode selection in a smear preparing apparatus according to an embodiment.
Figure 22:
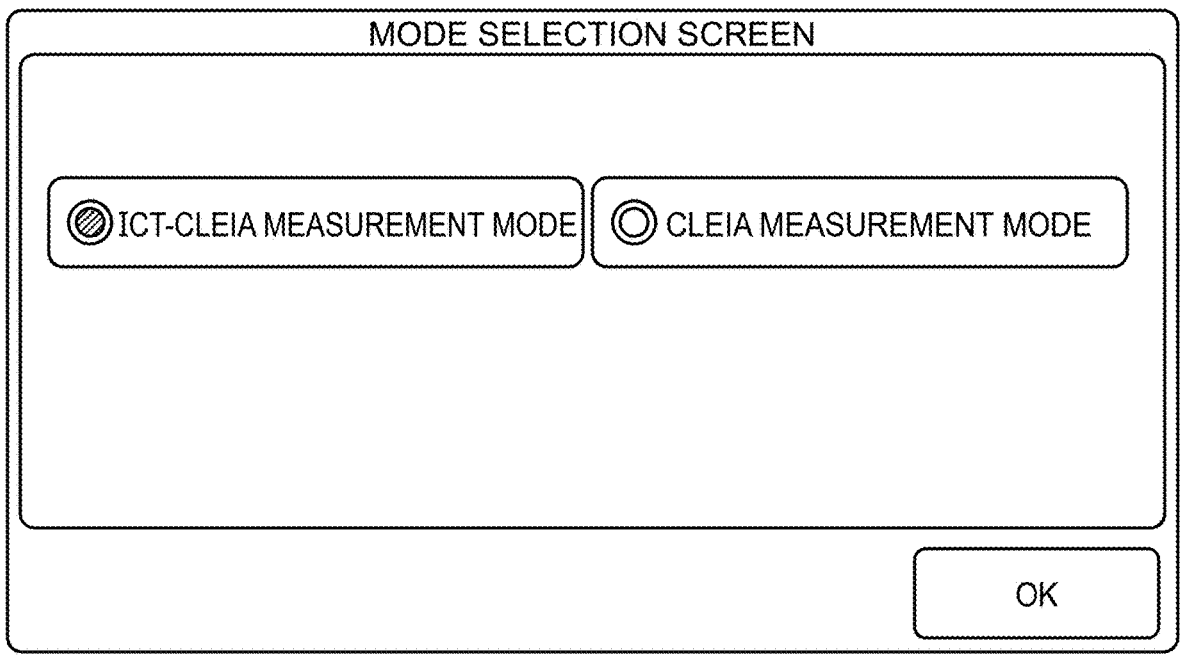
FIG. 22 is a diagram illustrating an eighth example of a selection screen in mode selection in a sample processing apparatus according to a modified example of an embodiment.

An immunoassay apparatus that is a modified example of an embodiment is configured to execute a first presentation step of presenting, instead of the first operation mode that is the operation mode of staining tank ON and the second operation mode that is the operation mode of staining tank OFF illustrated in FIGS. 14 and 16, operation modes of a first operation mode that is an immune complex transfer chemiluminescent enzyme immunoassay (ICT-CLEIA) measurement mode in which measurement is performed by using an ICT-CLEIA method combining a chemiluminescent enzyme immunoassay method and an immune complex transfer immunoassay method and a second operation mode that is a chemiluminescent enzyme immunoassay (CLEIA) measurement mode in which measurement is performed by using a CLEIA method while causing selection of one of these operation modes. Specifically, the controller controls the display unit such that the display unit displays a mode selection screen illustrated in FIG. 22. In the displayed mode selection screen, the controller can receive selection of one of the operation modes of the first operation mode that is the ICT-CLEIA measurement mode and the second operation mode that is the CLEIA measurement mode, from the user.

Figure 23:
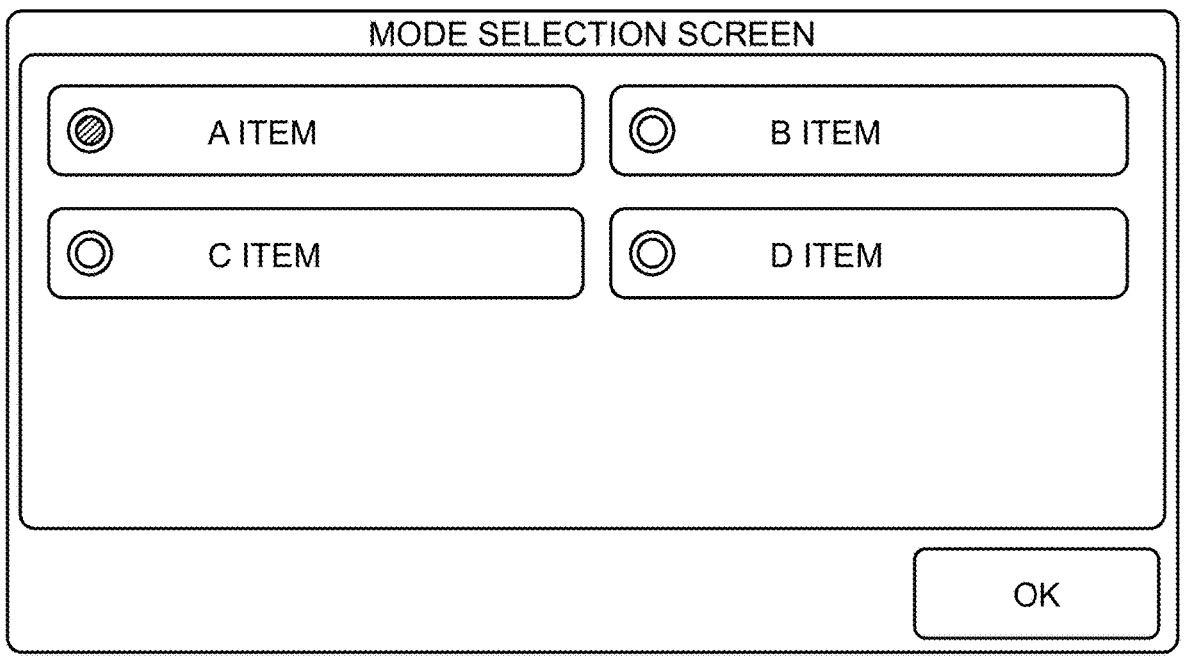
FIG. 23 is a diagram illustrating a ninth example of a selection screen in mode selection in a sample processing apparatus according to a modified example of an embodiment.

When the user selects the first operation mode that is the ICT-CLEIA measurement mode, the controller executes a second presentation step of presenting operation modes for selecting measurement matters relating to the first operation mode that is the ICT-CLEIA measurement mode while causing selection thereof. Specifically, the controller controls the display unit such that the display unit displays a mode selection screen illustrated in FIG. 23. In this selection screen, the controller can receive selection of one of operation modes causing selection of measurement items of an A item, a B item, a C item, and a D item, from the user. In this case, the measurement items include, for example, HIV antibody, HA antibody, HBs antibody, HBc antibody, HCV antibody, syphilis antibody, and the like.

Figure 24:
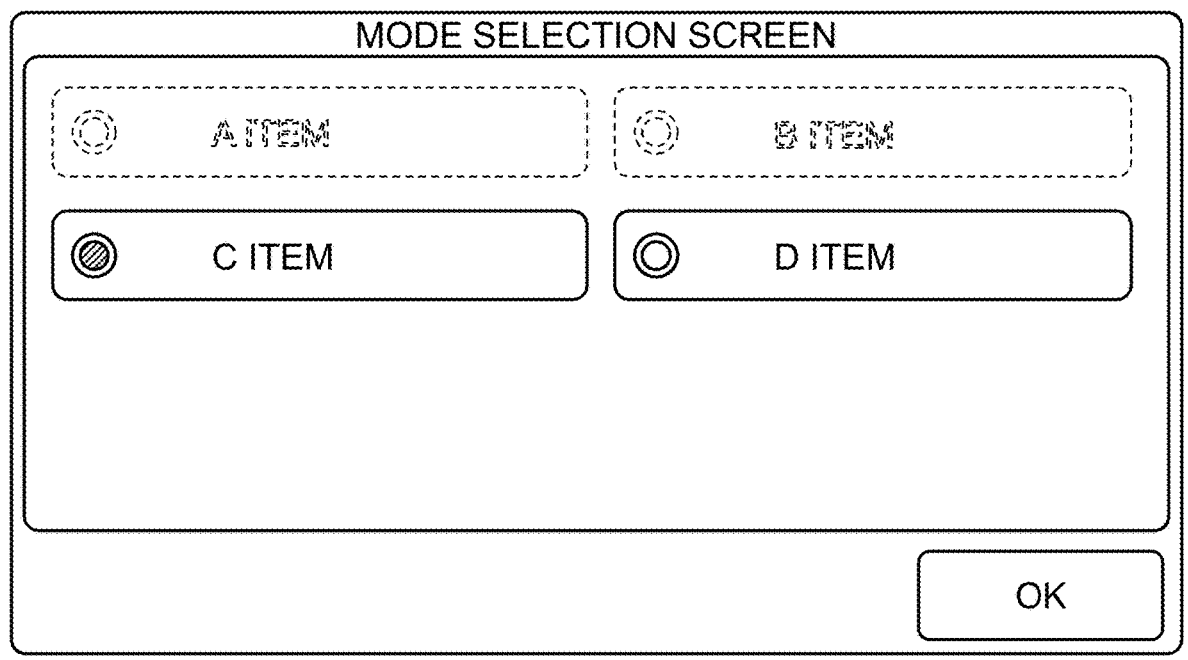
FIG. 24 is a diagram illustrating a tenth example of a selection screen in mode selection in a sample processing apparatus according to a modified example of an embodiment.
Figure 25:
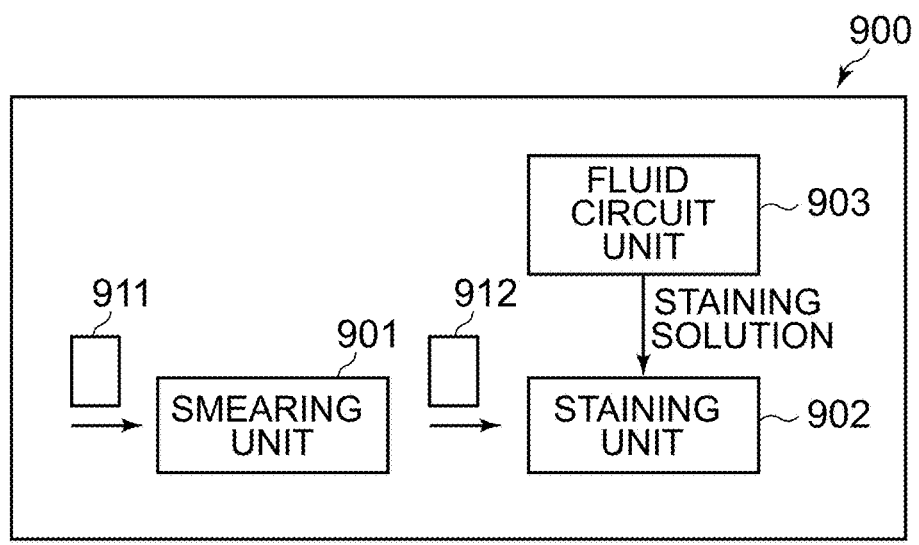
FIG. 25 is a schematic diagram illustrating an overview of a conventional smear preparing apparatus.

When the second operation mode that is the CLEIA measurement mode is selected, the controller executes a third presentation step of presenting the measurement items of the A item and the B item that are selectable in the first operation mode being the ICT-CLEIA measurement mode while prohibiting the selection of the A item and the B item. In the third presentation step, the controller presents the measurement items of the A item and the B item while prohibiting the selection thereof and presents the measurement items of the C item and the D item. Specifically, the controller controls the display unit such that the display unit displays a mode selection screen illustrated in FIG. 24. In the mode selection screen illustrated in FIG. 24, the controller can receive selection of only the measurement items of the C item and the D item from the user and prohibits the user from selecting the measurement items of the A item and the B item by graying-out these measurement items.

Such a configuration allows the user to select an appropriate operation mode depending on a selected operation mode and can thus improve user operability.

Note that the embodiments disclosed herein should be considered as exemplary in all respects and does not limit the present invention. The scope of the present invention is defined not by the description of the aforementioned embodiments but by the scope of claims, and includes all equivalents and all modifications within the scope of claims.

The invention claimed is:

1. A smear preparing apparatus that operates under selectable operation modes, comprising:
   a smearing unit that prepares smeared slides by smearing samples onto slides;
   a staining unit that is capable of housing the smeared slides and that performs staining processing by accommodating a staining solution used to stain the samples on the housed smeared slides;
   a fluid circuit that supplies the staining solution to the staining unit; and
   a controller that is programed to control the supplying of the staining solution to the staining unit depending on a selected one of the selectable operation modes, wherein
   the controller is programed, in response to a smearing mode under which the smeared slides are prepared by the smearing unit and the staining processing is not performed on the smeared slides being selected among the selectable operation modes, to cause no staining solution to be supplied to the staining unit.

2. The smear preparing apparatus according to claim 1, wherein
   the selectable operation modes comprise a first operation mode to supply the staining solution and a second operation mode to not supply the staining solution, the second operation mode comprising the smearing mode,
   the controller is programed, in response to the first operation mode being selected, to control the fluid circuit to supply the staining solution to the staining unit, and
   the controller is programed, in response to the second operation mode being selected, to control the fluid circuit to cause no staining solution to be supplied to the staining unit.

3. The smear preparing apparatus according to claim 2, wherein the controller is programed, in response to the first operation mode being selected, to further receive a selection among operation modes comprising at least one of a smearing staining mode in which the smeared slides are prepared and the staining processing is performed on the smeared slides, or a staining mode in which the staining processing is performed on smeared slides prepared in advance.

4. The smear preparing apparatus according to claim 3, wherein the controller is programed, in response to the second operation mode being selected, to prohibit a selection of the smearing staining mode and the staining mode.

5. The smear preparing apparatus according to claim 2, wherein the controller is programed, in response to the second operation mode being selected, to further receive a selection among operation modes comprising the smearing mode, and a printing mode in which information on the samples is printed.

6. The smear preparing apparatus according to claim 1, further comprising a transfer unit that holds and transfers the smeared slides, wherein
   the transfer unit is configured to transfer the smeared slides from and to the staining unit one by one,
   the controller is programed to control the transfer unit to transfer the smeared slides to the staining unit one by one and to take out the smeared slides for which staining time has elapsed from the staining unit one by one in order.

7. The smear preparing apparatus according to claim 1, further comprising a printer that prints information on the samples, wherein
   the controller is programed to control the printer to print the information on the samples in predetermined regions of the slides.

8. The smear preparing apparatus according to claim 1, wherein the supplying of the staining solution to the staining unit comprises filling at least partially the staining unit with the staining solution and replenishing the staining unit, which has been at least partially filled with the staining solution.

9. The smear preparing apparatus according to claim 1, wherein
   the fluid circuit is capable of supplying a cleaning liquid to the staining unit, and
   in response to the staining solution being not supplied to the staining unit, the controller is programed to control the fluid circuit to supply no cleaning liquid to the staining unit.

10. The smear preparing apparatus according to claim 1, wherein the controller is programed to receive a selection of at least one of the selectable operation modes in activation.

11. The smear preparing apparatus according to claim 1, further comprising a display unit, wherein
    the controller is programed to control the display unit to display a manipulation screen to receive a predetermined manipulation made by the user, and
    the controller is programed to receive a selection of at least one of the selectable operation modes through the manipulation screen.

12. The smear preparing apparatus according to claim 11, wherein the controller is programed to control the display unit to display the manipulation screen to receive a manipulation indicating whether to supply the staining solution.

13. The smear preparing apparatus according to claim 12, wherein is programed, in response to a manipulation for a second operation mode being received through the manipulation screen, to control the display unit to receive a selection of one of the smearing mode and a print mode in which information on the samples is printed.

14. A sample processing apparatus that operates under selectable operation modes, comprising:
    a sample processor that performs processing on samples; and
    a controller, wherein
    the controller is programed to execute a first presentation step of presenting the selectable operation modes to receive a selection among the selectable operation modes,
    in response to a first operation mode to supply a staining solution to a staining unit being selected-among the presented selectable operation modes, the controller is programed to execute a second presentation step of presenting operation modes relating to the first operation mode to receive a selection among the operation modes relating to the first operation mode, and
    in response to a second operation mode to supply no staining solution to the staining unit being selected among the presented selectable operation modes, the controller is programed to execute a third presentation step of prohibiting a selection of at least one of the operation modes relating to the first operation mode, wherein operation modes relating the second operation mode include a smearing mode under which smeared slides are prepared and a staining processing is not performed on the smeared slides.

* * * * *